(12) United States Patent
Fukushima et al.

(10) Patent No.: US 9,039,037 B2
(45) Date of Patent: May 26, 2015

(54) SIDE AIRBAG DEVICE FOR VEHICLE

(75) Inventors: Satoshi Fukushima, Toyota (JP); Shigeki Hayashi, Kasugai (JP); Shinobu Tanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/819,065

(22) PCT Filed: Apr. 17, 2012

(86) PCT No.: PCT/JP2012/060363
§ 371 (c)(1),
(2), (4) Date: Feb. 26, 2013

(87) PCT Pub. No.: WO2013/157082
PCT Pub. Date: Oct. 24, 2013

(65) Prior Publication Data
US 2015/0035262 A1 Feb. 5, 2015

(51) Int. Cl.
B60R 21/231 (2011.01)
B60R 21/233 (2006.01)
B60R 21/2346 (2011.01)
B60R 21/00 (2006.01)

(52) U.S. Cl.
CPC ......... B60R 21/23138 (2013.01); B60R 21/233 (2013.01); B60R 21/2346 (2013.01); *B60R 2021/23146* (2013.01); *B60R 2021/0009* (2013.01)

(58) Field of Classification Search
CPC .................. B60R 21/233; B60R 2021/23146; B60R 2021/0009
See application file for complete search history.

(56) References Cited

U.S. PATENT DOCUMENTS

| 5,586,782 | A  | * | 12/1996 | Zimmerman et al. | 280/730.2 |
| 6,378,896 | B1 | * | 4/2002  | Sakakida et al.  | 280/730.2 |
| 7,357,411 | B2 | * | 4/2008  | Kurimoto et al.  | 280/729   |
| 8,056,923 | B2 | * | 11/2011 | Shimono          | 280/730.2 |
| 8,322,747 | B2 | * | 12/2012 | Shankar          | 280/729   |
| 8,528,934 | B2 | * | 9/2013  | Kobayshi et al.  | 280/740   |

(Continued)

FOREIGN PATENT DOCUMENTS

EP 1873024 A1 1/2008
JP 2000-280853 10/2000

(Continued)

OTHER PUBLICATIONS

Mar. 4, 2015 Search Report issued in European Application No. 12829135.8.

*Primary Examiner* — Nicole Verley
(74) *Attorney, Agent, or Firm* — Oliff PLC

(57) ABSTRACT

In an inflated and expanded state of a side airbag, a forwardly extending portion, provided at an upper portion of a rear side bag portion, extends from a side of a shoulder portion of a seated passenger toward a vehicle front side and is disposed above a front side bag portion. A dimension in a vehicle transverse direction of this forwardly extending portion is set to be smaller than that of the front side bag portion, and a vehicle transverse direction inner side surface at an upper end side of the front side bag portion is inclined or curved so as to rise-up while heading toward a vehicle transverse direction outer side. An upper arm portion is pushed-up due to sliding contact with this surface. Even when the seated passenger inertially toward an oblique front of a vehicle, the shoulder portion can be restrained by the forwardly extending portion.

12 Claims, 16 Drawing Sheets

(56) References Cited

U.S. PATENT DOCUMENTS

| | | | |
|---|---|---|---|
| 8,608,198 B2 * | 12/2013 | Shibayama et al. | 280/742 |
| 8,783,712 B2 * | 7/2014 | Fukushima et al. | 280/730.2 |
| 8,915,519 B2 * | 12/2014 | Hotta et al. | 280/729 |
| 2008/0079248 A1 | 4/2008 | Hayashi | |
| 2010/0140906 A1 * | 6/2010 | Honda et al. | 280/730.2 |
| 2011/0012330 A1 | 1/2011 | Sato et al. | |
| 2012/0175925 A1 | 7/2012 | Suzuki et al. | |
| 2014/0239618 A1 * | 8/2014 | Katsumata | 280/728.3 |

FOREIGN PATENT DOCUMENTS

| | | | |
|---|---|---|---|
| JP | 2008-201175 | 9/2008 | |
| JP | 2009-137536 | 6/2009 | |
| JP | 2010-132072 | 6/2010 | |
| WO | WO 2011/087026 A1 | 7/2011 | |
| WO | WO 2014/115351 A1 * | 7/2014 | B60R 21/207 |

* cited by examiner

FIG.15
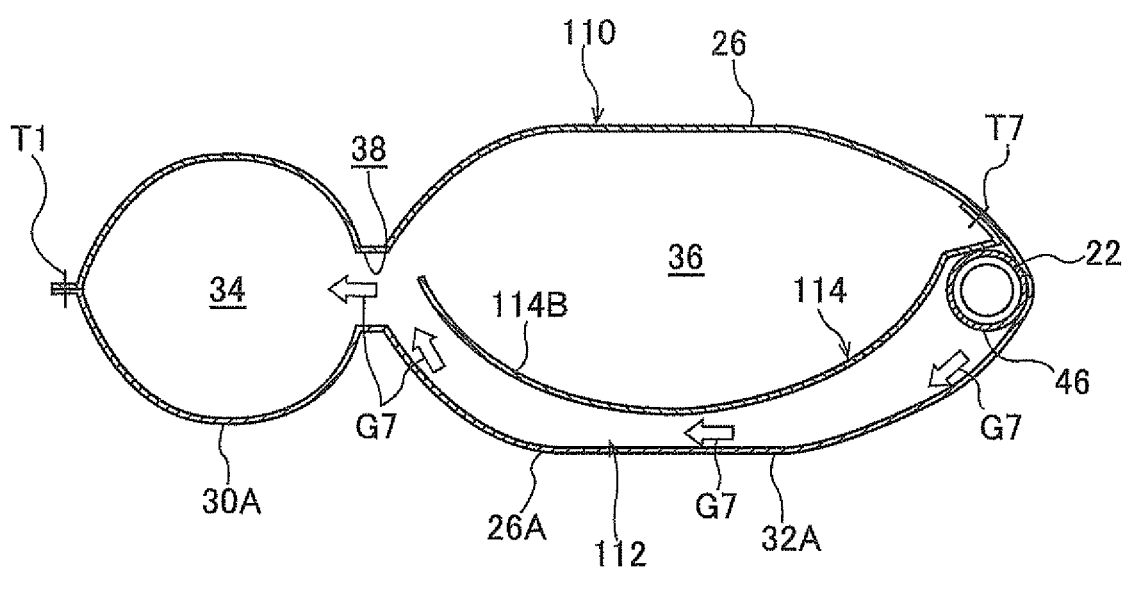
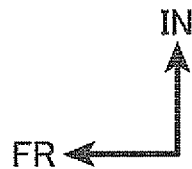

SIDE AIRBAG DEVICE FOR VEHICLE

TECHNICAL FIELD

The present invention relates to a side airbag device for a vehicle.

BACKGROUND ART

In the side airbag device for a vehicle that is set forth in following Patent Document 1, an airbag has a rear side tube bag portion that, at a time of inflation and expansion, extends in the vertical direction at the side further toward the vehicle rear than a vehicle transverse direction outer side end of the chest portion of a seated passenger, and a front side tube bag portion that is positioned further toward the vehicle front side than the rear side tube bag portion and further toward the vehicle front side than the vehicle transverse direction outer side end of the chest portion of the seated passenger and that extends in the vertical direction. The upper portion of the rear side tube bag portion is made to be a shoulder restraining portion that is positioned at the side of the shoulder portion of the seated passenger and restrains the shoulder portion. The upper edge of the front side tube bag is made to be an arm support portion that is at a position lower than the armpit of the seated passenger further toward the vehicle front side than the shoulder restraining portion, and on which the upper arm portion of the seated passenger is placed.

Namely, at this side airbag device for a vehicle, the shoulder portion of the seated passenger, that has relatively high resistance, is restrained by the shoulder restraining portion, and on the other hand, the upper arm portion becoming interposed between the airbag and the chest portion of the seated passenger, that has relatively low resistance, is suppressed due to the upper arm portion of the seated passenger being placed on the arm support portion.

PRIOR ART DOCUMENTS

Patent Documents

Patent Document 1: Japanese Patent Application Laid-Open No. 2010-132072

DISCLOSURE OF INVENTION

Technical Problem

However, in a case in which the form of a side collision is a so-called oblique side collision, there are cases in which the seated passenger inertially moves toward the obliquely front side of the vehicle. In such a case, there is the possibility that the shoulder portion of the seated passenger will come away from the shoulder restraining portion and that the restraining of the shoulder portion of the seated passenger will not continue up through the latter half of the collision.

In view of the above-described circumstances, an object of the present invention is to provide a side airbag device for a vehicle in which the upper arm portion of a seated passenger becoming interposed between the chest portion of the seated passenger and a side airbag can be suppressed, and that can restrain the shoulder portion of the seated passenger well by the side airbag regardless of the form of a side collision.

Solution to Problem

A side airbag device for a vehicle relating to a first aspect of the present invention comprises: an inflator that is provided at a vehicle seat and that, when a side collision of a vehicle is sensed or predicted, is operated and generates gas; and a side airbag that is provided at a side portion of a seat back of the vehicle seat, and that inflates and expands between a seated passenger and a vehicle body side portion due to gas that the inflator generates being supplied to an interior of the side airbag, and that, in an inflated and expanded state, is divided into a front side bag portion and a rear side bag portion that are lined-up in a vehicle longitudinal direction, and at which a forwardly extending portion, that is provided at an upper portion of the rear side bag portion, extends from a side of a shoulder portion of the seated passenger toward a vehicle front side and is disposed above the front side bag portion, and, due to a dimension in a vehicle transverse direction of the forwardly extending portion being set to be smaller than that of the front side bag portion, a vehicle transverse direction inner side surface at an upper end side of the front side bag portion is inclined or curved so as to rise up while heading toward a vehicle transverse direction outer side.

Note that, in the first aspect, the relationship between the passenger and the side airbag is set by using, for example, a world side impact dummy (WorldSID).

In the first aspect, when a side collision of the vehicle is sensed or predicted, the inflator is operated and generates gas, and the gas is supplied to the interior of the side airbag. Due thereto, the side airbag inflates and expands between the seated passenger and a vehicle body side portion. This side airbag is divided into a front side bag portion and a rear side bag portion, that are lined-up in the vehicle longitudinal direction in the inflated and expanded state. A forwardly extending portion, that is provided at the upper portion of the rear side bag portion, extends from the side of the shoulder portion of the seated passenger toward the vehicle front side and is disposed above the front side bag portion. The dimension in the vehicle transverse direction (the inflated thickness) of this forwardly extending portion is set to be smaller than that of the front side bag portion. Due thereto, the vehicle transverse direction inner side surface at the upper end side of the front side bag portion is inclined or curved so as to rise-up while heading toward the vehicle transverse direction outer side.

Therefore, due to the side airbag and the seated passenger approaching relatively due to the impact of a side collision, the aforementioned inclined or curved surface and the upper arm portion of the seated passenger slidingly contact, and force that pushes the upper arm portion upward is generated. As a result, the upper arm portion is pushed-up toward above the front side bag portion, and is restrained by the forwardly extending portion that is disposed above the front side bag portion. Due thereto, the upper arm portion becoming interposed between the chest portion of the seated passenger and the side airbag can be suppressed.

Moreover, as described above, the above-described forwardly extending portion extends from the side of the shoulder portion of the seated passenger toward the vehicle front side and is disposed above the front side bag portion. Therefore, for example, even when the form of the side collision is an oblique side collision and the seated passenger inertially moves toward the obliquely front side of the vehicle, it can be made such that the shoulder portion of the seated passenger does not come away from the forwardly extending portion. Due thereto, the shoulder portion of the seated passenger can be restrained well by the side airbag regardless of the form of the side collision.

In a side airbag device for a vehicle relating to a second aspect of the present invention, in the first aspect, the front side bag portion has a rearwardly extending portion that extends toward below the rear side bag portion, and inflates and expands at a side of an abdomen portion and a chest portion front side of the seated passenger, and the rear side bag portion inflates and expands at a side of a chest portion rear side and the shoulder portion of the seated passenger.

In the second aspect, the abdomen portion and the chest portion front side of the seated passenger, that have relatively low resistance, can be restrained by the front side bag portion that is inflated and expanded. Further, the chest portion rear side and the shoulder portion of the seated passenger, that have relatively high resistance, can be restrained by the rear side bag portion that is inflated and expanded. Moreover, due to the upper arm portion of the seated passenger that has relatively high resistance being pushed-up as described above, this upper arm portion can be restrained by the forwardly extending portion of the rear side bag portion. Moreover, the chest portion of the seated passenger can be restrained from the front and rear by the front side bag portion and the rear side bag portion, and the side surface of the chest portion can be restrained so as to be covered along the curve thereof. Due thereto, the positional relationship, in the vehicle longitudinal direction, of the chest portion and the side airbag can be stabilized.

In a side airbag device for a vehicle relating to a third aspect of the present invention, in the second aspect, the side airbag is formed such that a boundary, in the vehicle longitudinal direction, of the front side bag portion and the rear side bag portion in an inflated and expanded state faces a longitudinal direction central side of a chest portion of the seated passenger.

In the third aspect, a sewn portion or a tether, that divides the side airbag into the front side bag portion and the rear side bag portion, is usually set at the aforementioned boundary. Therefore, in a vicinity of this boundary, the vehicle transverse direction inner side surface of the side airbag is concave toward the vehicle transverse direction outer side. Accordingly, due to this concave abutting the longitudinal direction central side at the side surface of the chest portion (i.e., the side that projects-out most toward the vehicle transverse direction outer side), load to the chest portion (the ribs and the like) can be reduced.

In a side airbag device for a vehicle relating to a fourth aspect of the present invention, in the second or third aspect, the side airbag is structured such that, in an inflated and expanded state, an internal pressure of the rear side bag portion is higher than an internal pressure of the front side bag portion.

In the fourth aspect, in the state in which the side airbag is inflated and expanded, the internal pressure of the rear side bag portion, that restrains the chest portion rear side, the shoulder portion and the upper arm portion of the seated passenger that have relatively high resistance, is higher than the internal pressure of the front side bag portion that restrains that chest portion front side and the abdomen portion of the seated passenger that have relatively low resistance. Due thereto, the regions that have relatively high resistance can be restrained effectively while load to the regions, that have relatively low resistance, of the body of the seated passenger is reduced. As a result, the passenger restraining performance by the side airbag can be improved.

In a side airbag device for a vehicle relating to a fifth aspect of the present invention, in any one aspect of the first through fourth aspects, a non-inflating portion is provided at the side airbag between an upper end of the front side bag portion and the forwardly extending portion.

In the fifth aspect, the non-inflating portion is provided at the side airbag as described above. Therefore, it can be made such that the forwardly extending portion does not interfere with the upper arm portion at the time when the upper arm portion of the seated passenger is pushed-up due to sliding contact with the vehicle transverse direction inner side surface at the upper end side of the front side bag portion. Due thereto, the upper arm portion can be pushed-up even better.

In a side airbag device for a vehicle relating to a sixth aspect of the present invention, in any one aspect of the first through fifth aspects, the forwardly extending portion is formed such that a dimension, in a vertical direction in an inflated and expanded state, becomes smaller while heading toward a front end side.

In the sixth aspect, the forwardly extending portion of the rear side bag portion is formed as described above, and the vertical width of the forwardly extending portion becomes narrow at the front end side. Therefore, the expansion performance of the forwardly extending portion into the narrow gap between the shoulder portion of the seated passenger and the vehicle body side portion can be improved.

In a side airbag device for a vehicle relating to a seventh aspect of the present invention, in the sixth aspect, the side airbag is formed such that, in a state in which the seat back is positioned at a reference setting position and the side airbag is inflated and expanded, an upper end of the front side bag portion is inclined forwardly and upwardly with respect to the vehicle longitudinal direction.

Note that the aforementioned "reference setting position" is the position (reclining angle) of the seat back that is determined by side impact test regulations (ECE R95) that are currently used in Japan and Europe and side impact test regulations (FMVSS214) of the United States, and is a position in which the ribs of the WorldSID that rests against the seat back are substantially horizontal.

In the seventh aspect, in the state in which the side airbag is inflated and expanded, the upper end of the front side bag portion is inclined forwardly and upwardly with respect to the vehicle longitudinal direction. Due thereto, the point of application of the pushing-up force, that is applied to the upper arm portion of the seated passenger due to the sliding contact with the vehicle transverse direction inner side surface at the upper end side of the front side bag portion (i.e., the surface that is inclined or curved so as to rise-up while heading toward the vehicle transverse direction outer side), can be set further toward the vehicle front side. As a result, the moment in the pushing-up direction that is applied to the upper arm portion can be made to be large, and therefore, the upper arm portion can be pushed-up even better.

In a side airbag device for a vehicle relating to an eighth aspect of the present invention, in any one aspect of the first through seventh aspects, a vent hole for discharging, to an exterior, gas that has been supplied to an interior, is formed in each of the front side bag portion and the rear side bag portion.

In the eighth aspect, by individually setting and changing the sizes of the vent holes that are formed in the front side bag portion and the rear side bag portion respectively, the internal pressures of the respective bag portions can easily be adjusted independently.

In a side airbag device for a vehicle relating to a ninth aspect of the present invention, in any one aspect of the first through eighth aspects, a gas flow path for supplying gas, that the inflator generates, independently to the front side bag portion interior and the rear side bag portion interior respectively, is provided at the side airbag.

In the ninth aspect, gas that the inflator generates can be independently supplied to the front side bag portion interior and the rear side bag portion interior respectively, by the gas flow path that is provided at the side airbag. Due thereto, gas staying within the respective bag portions can be suppressed, and the inflation and expansion of each bag portion can be promoted individually. Therefore, as a result, the early-stage expansion performance of the side airbag, i.e., the initial restraining performance of the seated passenger, can be improved.

In a side airbag device for a vehicle relating to a tenth aspect of the present invention, in any one aspect of the first through eighth aspects, the side airbag has a lower side bag portion that inflates and expands below the front side bag portion and at a side of a waist portion of the seated passenger.

In the tenth aspect, the waist portion of the seated passenger, that has relatively high resistance, can be restrained by the lower side bag portion of the side airbag. Therefore, the passenger restraining performance by the side airbag can be improved more.

In a side airbag device for a vehicle relating to an eleventh aspect of the present invention, in the tenth aspect, a gas flow path for supplying gas, that the inflator generates, independently to the front side bag portion interior, the rear side bag portion interior, and the lower side bag portion interior respectively, is provided at the side airbag.

In the eleventh aspect, gas that the inflator generates can be independently supplied to the front side bag portion interior, the rear side bag portion interior, and the lower side bag portion interior respectively, by the gas flow path that is provided at the side airbag. Due thereto, gas staying within the respective bag portions can be suppressed, and the inflation and expansion of each bag portion can be promoted individually. Therefore, as a result, the early-stage expansion performance of the side airbag, i.e., the initial restraining performance of the seated passenger, can be improved.

In a side airbag device for a vehicle relating to a twelfth aspect of the present invention, in any one aspect of the first through eleventh aspects, the side airbag is formed such that, in an inflated and expanded state, a dimension in the vehicle transverse direction of a front portion side of a portion, that is further toward a lower side than the forwardly extending portion, is smaller than that of a rear portion side.

In the twelfth aspect, the side airbag is formed as described above. Further, as described in the above-described first aspect, the dimension in the vehicle transverse direction of the forwardly extending portion of the rear side bag portion is set to be smaller than that of the front side bag portion. Namely, the dimensions in the vehicle transverse direction (the inflated thicknesses) of the side airbag in the inflated and expanded state are set to the relationship "rear portion side of portion further toward lower side than forwardly extending portion>front portion side of portion further toward lower side than forwardly extending portion>forwardly extending portion". Due thereto, restraining that corresponds to the high/low level of the load resistance at the body of the seated passenger can be controlled not only by setting the internal pressures of the side airbag, but also by setting the above-described inflated thicknesses. As a result, the strength of the restraining force and the swiftness of the restraining by the side airbag and the like can be controlled more appropriately.

Advantageous Effects of Invention

As described above, in the side airbag device for a vehicle relating to the present invention, the upper arm portion of a seated passenger becoming interposed between the chest portion of the passenger and a side airbag can be suppressed, and the shoulder portion of the seated passenger can be restrained well by the side airbag regardless of the form of a side collision.

BRIEF DESCRIPTION OF DRAWINGS

FIG. 15 is an enlarged sectional view showing the plane that is cut along line F15-F15 of FIG. 14.

BEST MODES FOR CARRYING OUT THE INVENTION

First Embodiment

A side airbag device 10 for a vehicle relating to a first embodiment of the present invention is described on the basis of FIG. 1 through FIG. 8. Note that arrow FR, arrow UP and arrow IN that are shown appropriately in the respective drawings indicate the frontward direction (advancing direction) of the vehicle, the upward direction, and the inner side in the vehicle transverse direction, respectively. Hereinafter, when explanation is given by using merely the longitudinal and vertical directions, they indicate longitudinal of the vehicle longitudinal direction and vertical of the vehicle vertical direction unless specifically noted.

(Structure)

Figure 1:
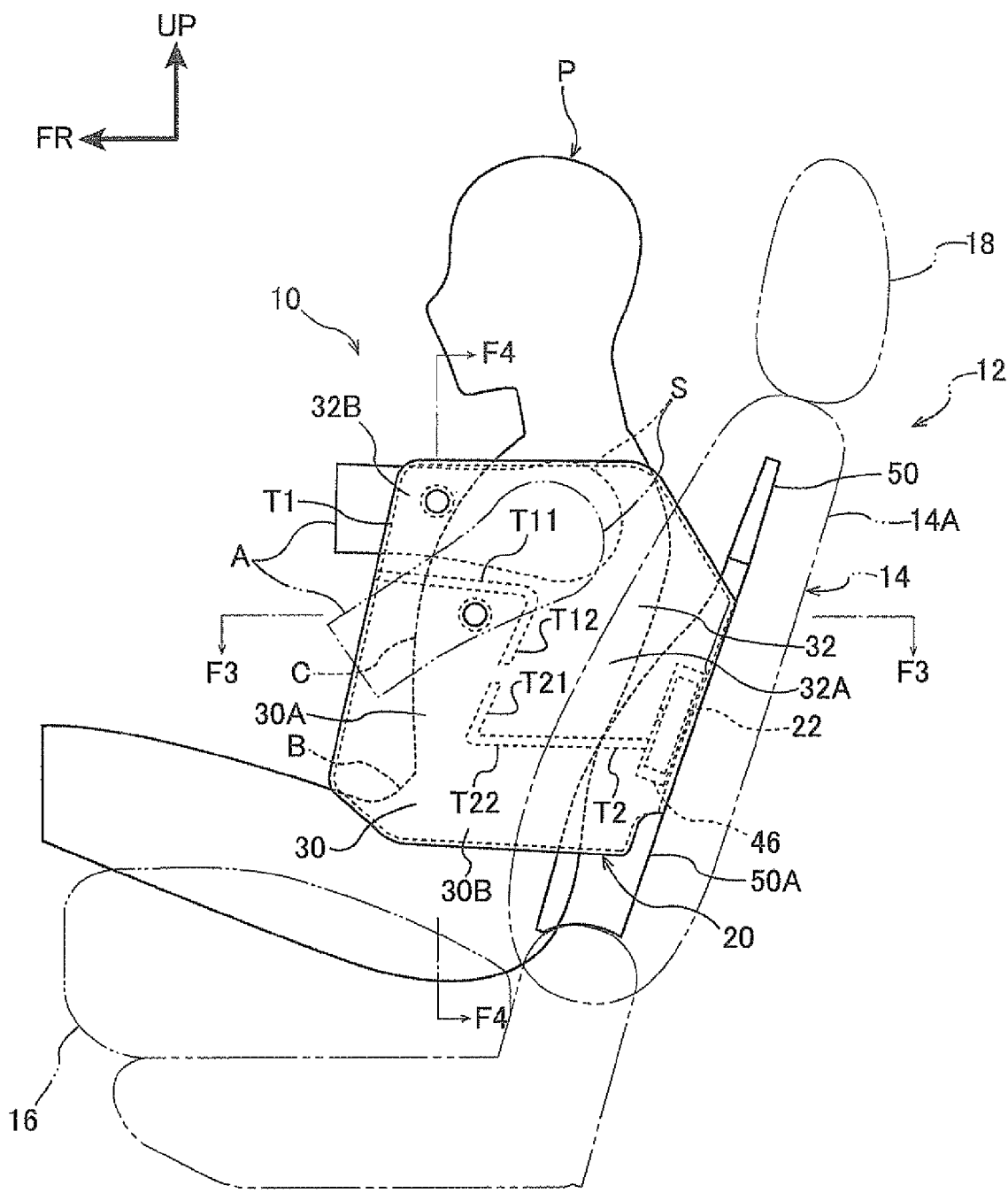
FIG. 1 is a side view of a vehicle seat, in which a side airbag device for a vehicle relating to a first embodiment of the present invention is installed, and is a drawing of a state in which a side airbag, that this same side airbag device has, is inflated and expanded.

As shown in FIG. 1, the side airbag device 10 relating to the present embodiment is installed in a door-side side portion 14A (the side portion at a side door 58 side shown in FIG. 4 and FIG. 5) of a seat back 14 at a vehicle seat 12. This seat back 14 is reclinably connected to the rear end portion of a seat cushion 16, and a headrest 18 is connected to the upper end portion.

Note that, in the present embodiment, the forward direction, upward direction and transverse direction of the vehicle seat 12 coincide with the forward direction, the upward direction, and the transverse direction of the vehicle. Further, in FIG. 1, instead of an actual passenger, a world side impact dummy (WorldSID) P is seated in the vehicle seat 12. The seated posture thereof is determined in accordance with side impact test regulations (ECE R95) that are currently adopted in Japan and Europe, or side impact test regulations (FMVSS214) of the United States. Further, the angle of inclination (reclining angle) of the seat back 14 with respect to the seat cushion 16 is set to a reference setting position that corresponds to the aforementioned seated posture. Hereinafter, for convenience of explanation, the world side impact dummy P is called "seated passenger P".

The side airbag device 10 has a side airbag 20, and an inflator 22 that serves as a gas generating means that generates gas within the side airbag 20. The side airbag 20 is disposed at the interior of the door-side side portion 14A in a state of being folded-up and made into a unit together with the inflator 22 and the like. Note that a state in which the side airbag 20 is inflated and expanded due to the pressure of gas that the inflator 22 generates (an expansion completed state) is shown in FIG. 1. Further, a seat back pad 24 (see FIG. 3) that is covered by an unillustrated seat skin, is disposed at the periphery of the side airbag device 10. At the time when the side airbag 20 inflates and expands, the seat back pad 24 and sewn-together portions of this seat skin rupture (the state shown in FIG. 3).

Figure 2:
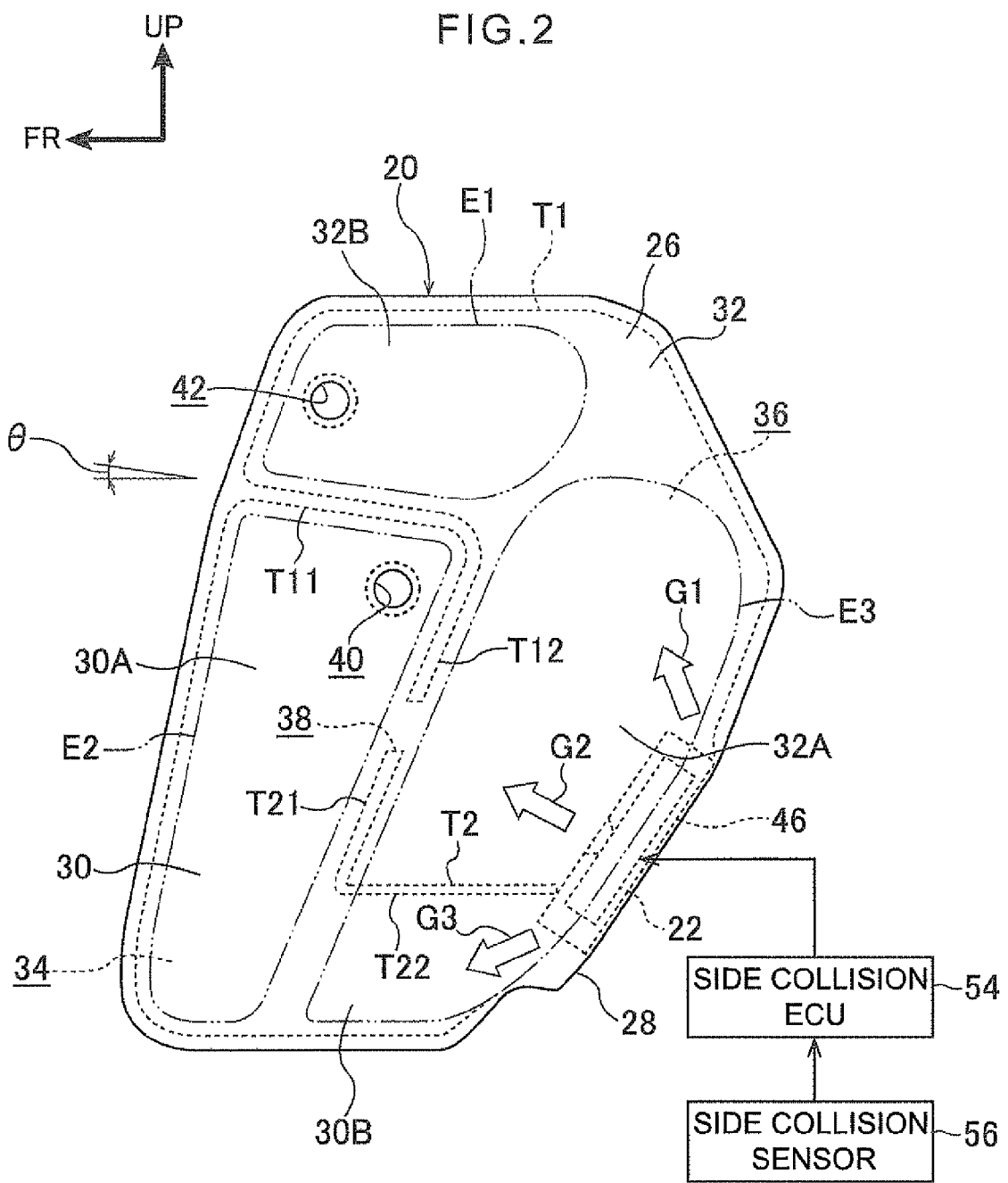
FIG. 2 is an enlarged side view showing, in an enlarged manner, the side airbag of FIG. 1.

As shown in FIG. 2, the side airbag 20 is a so-called two-chamber 2D side airbag. This side airbag 20 is formed in the shape of a bag due to a single base cloth 26, that is formed by cutting-out a nylon or polyester fabric for example, being folded along fold line 28 and overlapped, and the peripheral edge portion thereof being sewn at a sewn portion T1. Note that the side airbag 20 is not limited to a structure that is sewn by the single base cloth 26, and the side airbag 20 that is bag-shaped may be a structure that is formed by overlapping a pair of base cloths and sewing the peripheral edge portions thereof. Further, the longitudinal and vertical directions of the side airbag 20 that are described in the following explanation are the directions in the state in which the side airbag 20 is inflated and expanded, and substantially coincide with the longitudinal and vertical directions of the vehicle.

The aforementioned sewn portion T1 has an upper laterally extending portion T11, that extends from the upper portion side of the front edge portion of the side airbag 20 toward the rear end side of the side airbag 20 and reaches a vicinity of the longitudinal direction intermediate portion of the side airbag 20, and an upper vertically extending portion T12, that extends from the rear end of the upper laterally extending portion T11 toward the lower end side of the side airbag 20 and reaches a vicinity of the central portion of the side airbag 20. The base cloth 26 is sewn also at this upper laterally extending portion T11 and upper vertically extending portion T12. Moreover, the base cloth 26 is sewn also at a sewn portion T2. This sewn portion T2 is structured by a lower vertically extending portion T21, that extends from a vicinity of the lower end of the upper vertically extending portion T12 toward the lower end side of the side airbag 20 and reaches the lower portion of the side airbag 20, and a lower laterally extending portion T22, that extends from the lower end of the lower vertically extending portion T21 toward the rear end side of the side airbag 20 and reaches a vicinity of the rear end edge of the side airbag 20. Further, due to the base cloth 26 being sewn at this upper laterally extending portion T11, upper vertically extending portion T12, lower vertically extending portion T21 and lower laterally extending portion T22, the side airbag 20 is divided (sectioned) into a front side bag portion 30 that is L-shaped in side view, and a rear side bag portion 32 that is inverted L-shaped in side view.

The front side bag portion 30 is structured by a front side main body portion 30A, that extends in the vertical direction of the side airbag 20 at the front portion side of the side airbag 20, and a rearwardly extending portion 30B, that extends toward the rear portion side of the side airbag 20 from the lower end side of the front side main body portion 30A. The rear side bag portion 32 is structured by a rear side main body portion 32A, that extends in the vertical direction of the side airbag 20 at the rear portion side of the side airbag 20, and a forwardly extending portion 32B, that extends toward the front portion side of the side airbag 20 from the upper end side of the rear side main body portion 32A. The forwardly extending portion 32B is positioned at the upper side of the front side main body portion 30A, and the rearwardly extending portion 30B is positioned at the lower side of the rear side main body portion 32A.

The interior of the front side bag portion 30 is made to be a front side chamber 34, and the interior of the rear side bag portion 32 is made to be a rear side chamber 36. Namely, the interior of the side airbag 20 is divided into the front side chamber 34 and the rear side chamber 36. However, a communication hole 38 is formed due to sewing being omitted between the lower end of the upper vertically extending portion T12 and the upper end of the lower vertically extending portion T21, and the front side chamber 34 and the rear side chamber 36 are communicated via this communication hole 38. Further, the front side chamber 34 is communicated with the exterior of the side airbag 20 via a vent hole 40 that is formed in the upper end side of the front side main body portion 30A, and the rear side chamber 36 is communicated with the exterior of the side airbag 20 via a vent hole 42 that is formed in the front end side of the forwardly extending portion 32B.

The inflator 22, that is formed in a solid cylindrical shape, and a diffuser 46, that is formed in a cylindrical tube shape, are accommodated in the lower portion side of the rear end side of the rear side main body portion 32A. The inflator 22 is accommodated coaxially at the inner side of the diffuser 46, and is fixed to the diffuser 46 due to a portion of the diffuser 46 being caulked. As shown in FIG. 1, the inflator 22 and the diffuser 46 are disposed in a state in which the axial directions thereof run along the height direction of the seat back 14.

A pair of upper and lower stud bolts 48 (see FIG. 3) project-out from the outer peripheral portion of the diffuser 46 toward the vehicle transverse direction inner side. These stud bolts 48 pass-through the side airbag 20 and a side frame 50A of a seat back frame 50, and nuts 52 are screwed-together with the distal end sides thereof. Due thereto, the diffuser 46 is, together with the side airbag 20, fastened and fixed to the side frame 50A. The lower end side of the diffuser 46 is inserted into a gap that is formed between the rear end of the lower laterally extending portion T22 and the rear end edge (the fold line 28) of the side airbag 20, and projects-out into the rearwardly extending portion 30B (the front side chamber 34).

As shown in FIG. 2, a side collision ECU 54 that is installed in the vehicle is electrically connected to the above-described inflator 22. A side collision sensor 56 that senses a side collision is electrically connected this side collision ECU 54. The side collision ECU 54 is structured so as to operate the inflator 22 at the time when (the inevitability of) a side collision is sensed on the basis of a signal from the side collision sensor 56. Note that, in a case in which a pre-crash sensor that foresees (predicts) a side collision is electrically connected to the side collision ECU 54, there may be a structure in which the inflator 22 is operated at the time when the side collision ECU 54 foresees a side collision on the basis of a signal from the pre-crash sensor.

When the inflator 22 is operated, gas is jetted-out from gas jet-out ports that are provided at the lower end side of the inflator 22. The gas that is jetted-out from the gas jet-out ports is supplied to the rear side chamber 36 from an upper end opening portion of the diffuser 46 and an unillustrated opening portion that is formed in the vertical direction intermediate portion of the diffuser 46 (refer to arrows G1, G2 of FIG. 2). A portion of the gas that is supplied to the rear side chamber 36 is supplied to the front side chamber 34 via the communication hole 38. Further, the gas that is jetted-out from the gas jet-out ports of the inflator 22 is directly supplied to the front side chamber 34 from a lower end opening portion of the diffuser 46 (refer to arrow G3 of FIG. 2). Due thereto, the side airbag 20 is inflated and expanded between the seated passenger P and a vehicle body side portion (here, a door trim 60 of the side door 58 shown in FIG. 4 and FIG. 5).

As shown in FIG. 1, in the state in which the side airbag 20 is inflated and expanded, the front side bag portion 30 and the rear side bag portion 32 are lined-up in the longitudinal direction and the vertical direction. In this state, at the front side bag portion 30, the front side main body portion 30A inflates and expands at the side of the front side of a chest portion C of the seated passenger P, and the rear end of the upper end edge (the upper laterally extending portion T11) of the front side main body portion 30A is disposed at the side of the armpit portion of the seated passenger P. Further, the rearwardly extending portion 30B of the front side bag portion 30 inflates and expands at the side of an abdomen portion B of the seated passenger P. On the other hand, at the rear side bag portion 32, the rear side main body portion 32A inflates and expands at the side of the rear side of the chest portion C of the seated passenger P above the rearwardly extending portion 30B, and the forwardly extending portion 32B extends from the side of a shoulder portion S of the seated passenger P toward the vehicle front side and is disposed above the front side main body portion 30A. Hereinafter, the side airbag 20 in the inflated and expanded state is described in detail.

At this side airbag 20, a dimension W2 (see FIG. 3) in the vehicle transverse direction of the front portion side (refer to the region marked by reference numeral E2 in FIG. 2) of a portion that is further toward the lower side than the forwardly extending portion 32B is set to be smaller than a dimension W3 (see FIG. 3) in the vehicle transverse direction of the rear portion side (refer to the region marked by reference numeral E3 in FIG. 2) of the portion that is further toward the lower side than the forwardly extending portion 32B. Further, at this side airbag 20, a dimension W1 (see FIG. 4) in the vehicle transverse direction of the forwardly extending portion 32B (refer to the region marked by reference numeral E1 in FIG. 2) is set to be smaller than the dimension W2 in the vehicle transverse direction of the front side main body portion 30A. Namely, the dimensions in the vehicle transverse direction (the inflated thicknesses) of the side airbag 20 in the inflated and expanded state are set to the relationship W3>W2>W1.

Figure 5:
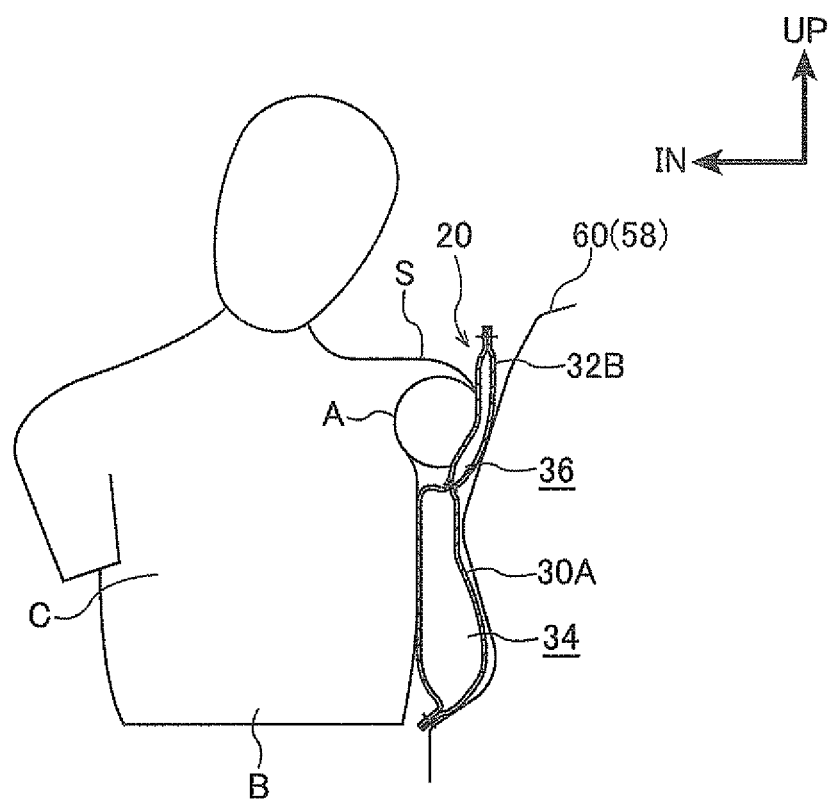
FIG. 5 is a vertical sectional view that corresponds to FIG. 4 and shows a state in which the side airbag is compressed between a seated passenger and a door trim due to impact of a side collision.
Figure 6:
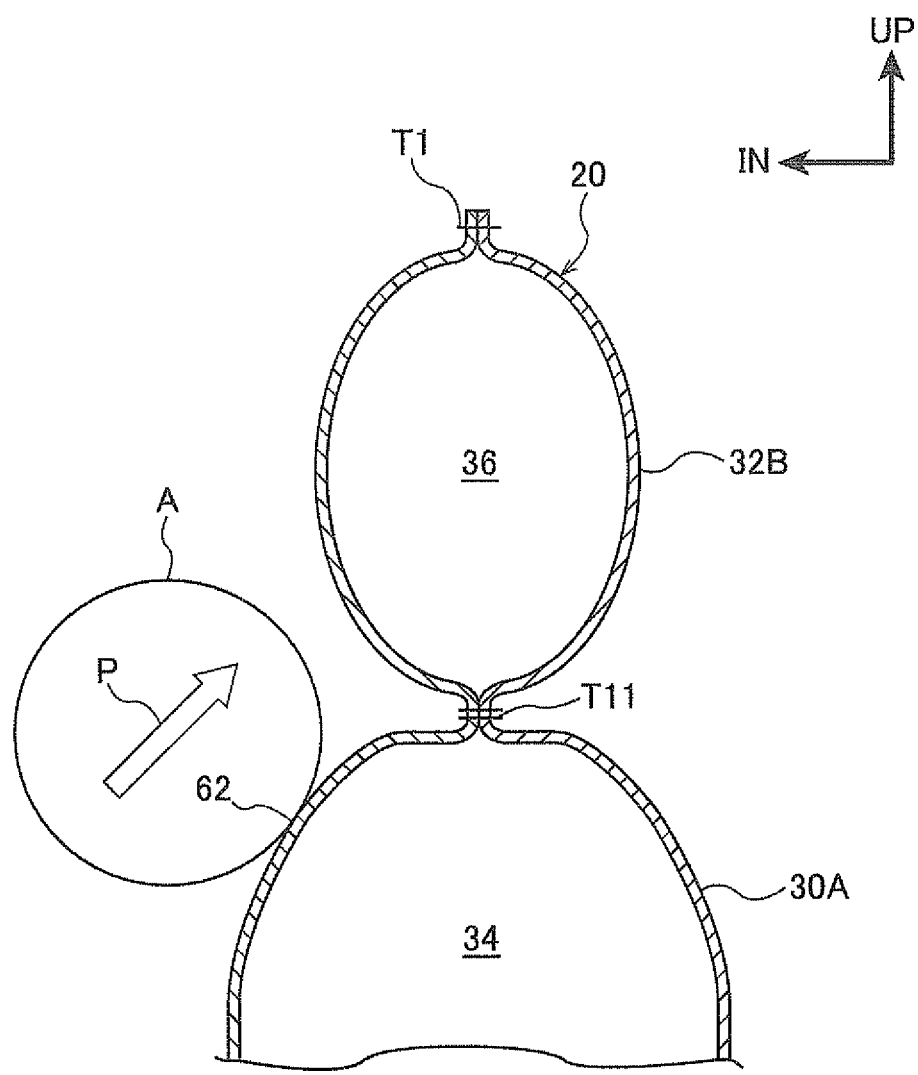
FIG. 6 is a vertical sectional view for explaining a situation in which an upper arm portion of the seated passenger is pushed upward due to sliding-contact with a front side bag portion.

Note that a state in which the side airbag 20 is compressed between the seated passenger P and the door trim 60 due to the impact of a side collision is shown in FIG. 5. Further, in the present embodiment, the above-described relationship of dimensions of the inflated thicknesses of the side airbag 20 is set in accordance with the positions of the upper laterally extending portion T11, the upper vertically extending portion T12, the lower vertically extending portion T21, and the lower laterally extending portion 122, and the upper vertically extending portion T12 and the lower vertically extending portion T21 are set further toward the front end side of the side airbag 20 than the longitudinal direction central portion of the side airbag 20.

Further, by setting the dimension W1 in the vehicle transverse direction of the forwardly extending portion 32B to be smaller than the dimension W2 in the vehicle transverse direction of the front side main body portion 30A (the front side bag portion 30) as described above, as shown in FIG. 6, the vehicle transverse direction inner side surface at the upper end side of the front side main body portion 30A is made to be an upper arm portion push-up surface 62 that is curved so as to rise-up while heading toward the vehicle transverse direction outer side. Note that the upper arm portion push-up surface 62 may be a structure that is inclined so as to rise-up while heading toward the vehicle transverse direction outer side.

Figure 7:
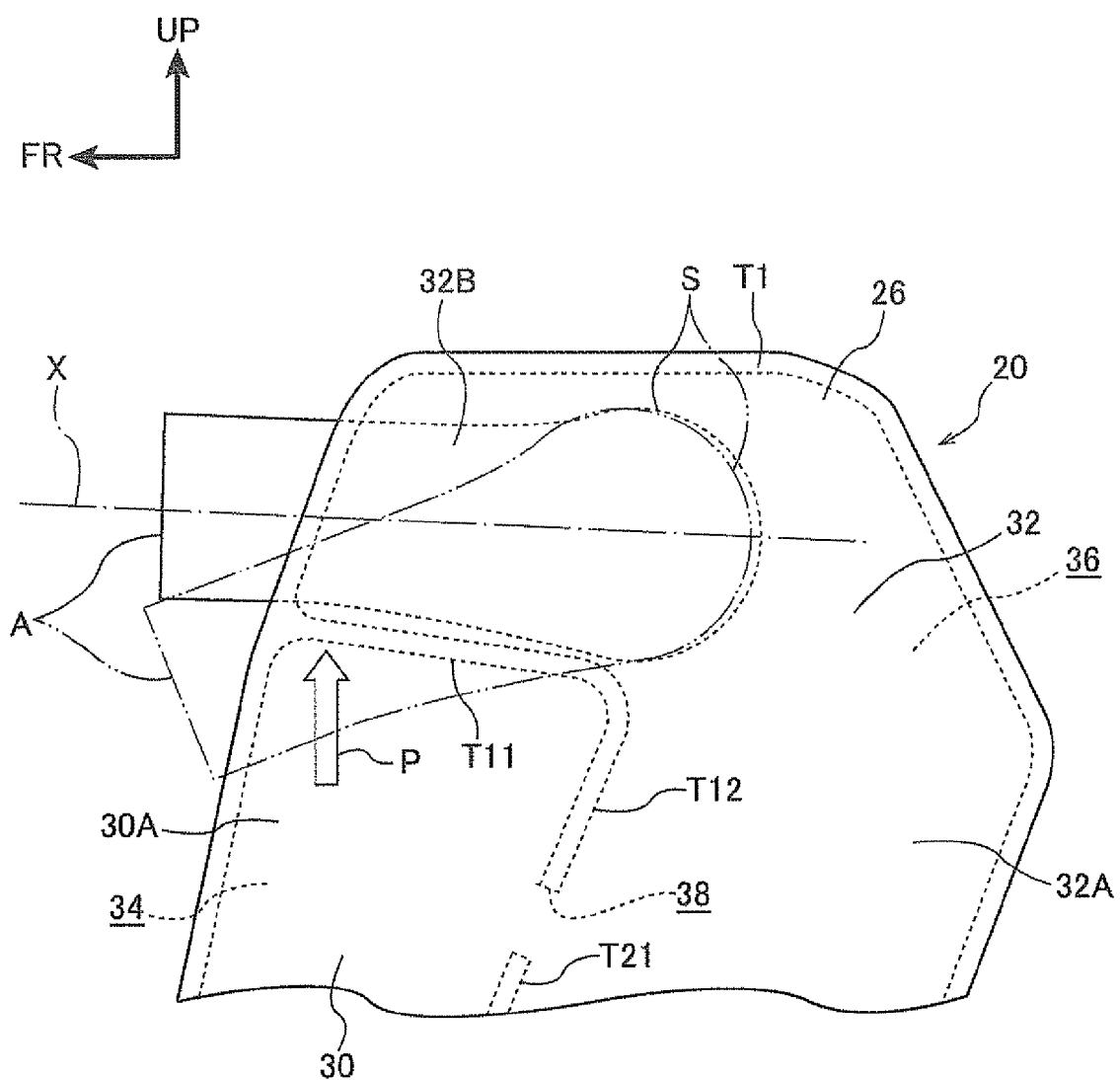
FIG. 7 is an enlarged side view in which a portion of FIG. 1 is enlarged.
Figure 8:
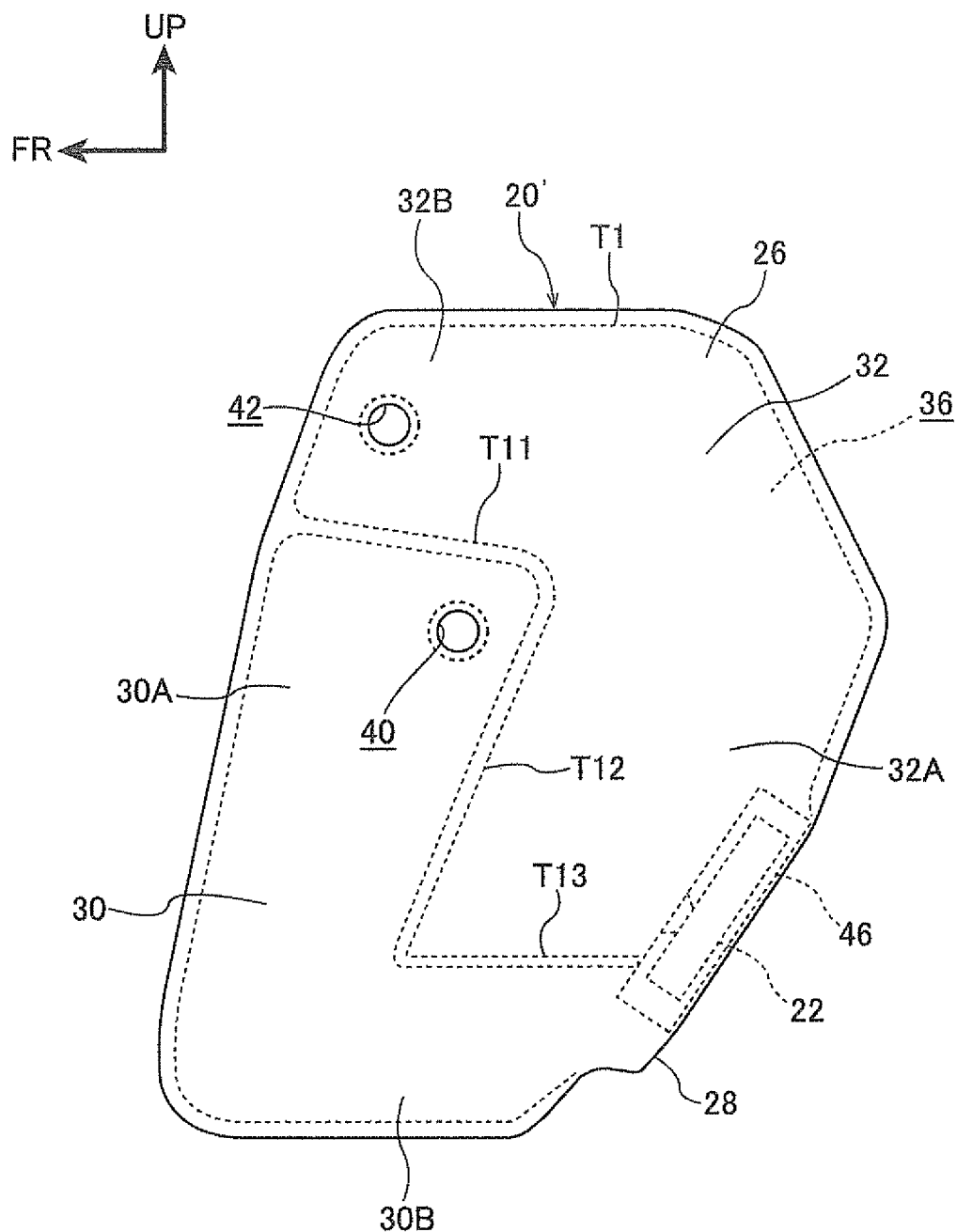
FIG. 8 is a side view showing an inflated and expanded state of a side airbag in a modified example of the first embodiment of the present invention.

Further, as shown in FIG. 2 and FIG. 7, the upper laterally extending portion T11, that is the upper end of the front side main body portion 30A (the upper end of the front side bag portion 30), is formed so as to be inclined forwardly and upwardly with respect to the vehicle longitudinal direction, when this side airbag 20 inflates and expands in a state in which the seat back 14 is positioned at the above-described reference setting position. Note that θ shown in FIG. 2 indicates the angle of inclination of the upper laterally extending portion T11 with respect to the vehicle longitudinal direction. Further, due to the upper laterally extending portion T11 being set in this way, the forwardly extending portion 32B is formed such that the vertical direction dimension thereof becomes smaller while heading toward the front end side, and inflates and expands in a substantially truncated cone shape whose axis X is inclined forwardly and upwardly with respect to the vehicle longitudinal direction. Note that illustration of the vent holes 40, 42 is omitted from FIG. 7 in relation to making the figure easy to view.

Figure 3:
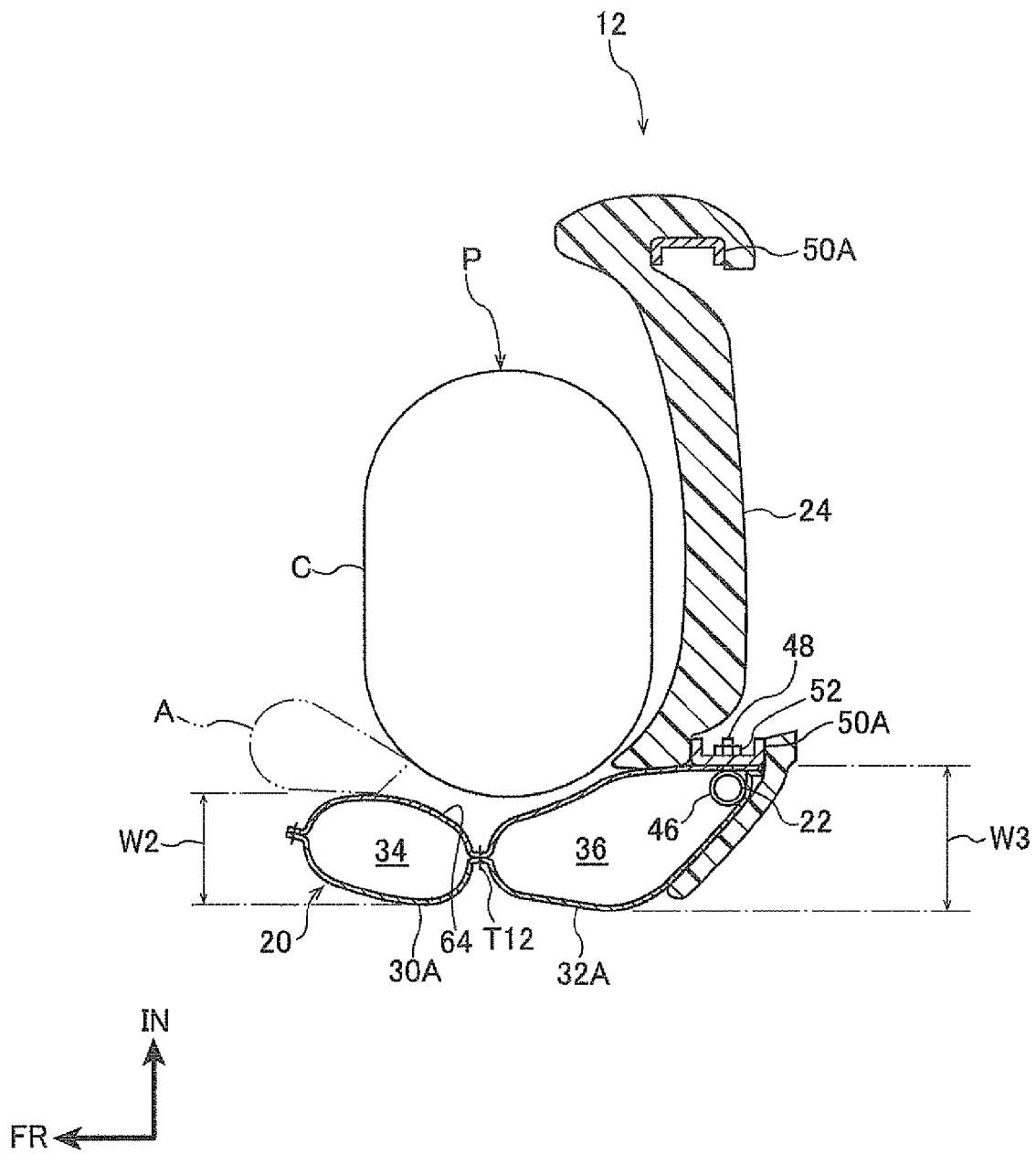
FIG. 3 is an enlarged sectional view showing the plane that is cut along line F3-F3 of FIG. 1.
Figure 4:
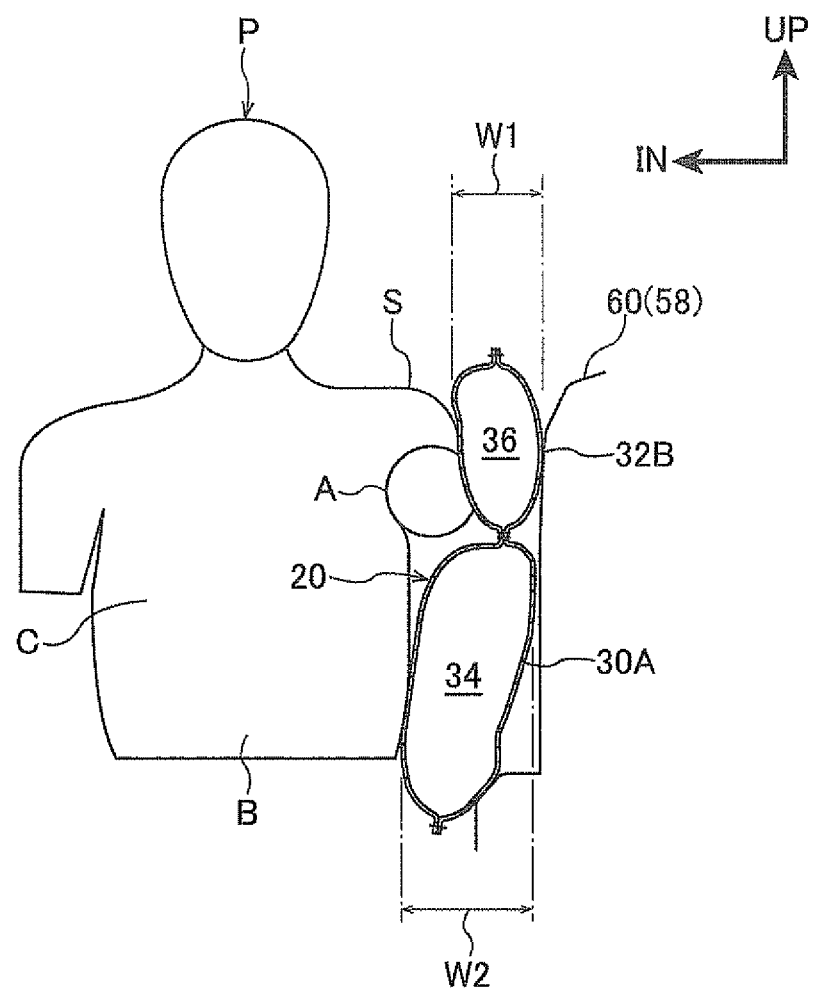
FIG. 4 is a cross-sectional view showing the plane that is cut along line F4-F4 of FIG. 1.

Further, as shown in FIG. 3, the side airbag 20 is formed such that the boundary in the vehicle longitudinal direction between the front side bag portion 30 and the rear side bag portion 32, i.e., the upper vertically extending portion T12 and the lower vertically extending portion T21 (see FIG. 2) that are set between the front side main body portion 30A and the rear side main body portion 32A, faces the longitudinal direction central side (the longitudinal direction center or a vicinity of the longitudinal direction center) of the chest portion C of the seated passenger P. At the side of this upper vertically extending portion T12 and lower vertically extending portion T21, in the plan view shown in FIG. 3, the vehicle transverse direction inner side surface of the side airbag 20 is concave toward the vehicle transverse direction outer side, and a concave portion 64 is formed. This concave portion 64 abuts the longitudinal direction central side (i.e., the side that projects-out most toward the vehicle transverse direction outer side) of the chest portion C.

Further, at this side airbag 20, the gas that is jetted-out from the inflator 22 is supplied (distributed) by the diffuser 46 to the front side chamber 34 and the rear side chamber 36, and a portion of the gas supplied to the front side chamber 34 is discharged-out from the vent hole 40, and a portion of the gas supplied to the rear side chamber 32 is discharged-out from the vent hole 42. Due thereto, there is a structure in which the internal pressure of the rear side chamber 36 in an inflated and expanded state is higher than the internal pressure of the front side chamber 34.

(Operation and Effects)

Operation and effects of the present embodiment are described next.

In the side airbag device 10 of the above-described structure, when the side collision ECU 54 senses a side collision due to a signal from the side collision sensor 56, the inflator 22 is operated by this side collision ECU 54. Thereupon, gas, that is jetted-out from the gas jetting-out holes of the inflator 22, is supplied to the front side chamber 34 and the rear side chamber 36 of the side airbag 20, and the side airbag 20 inflates and expands between the seated passenger P and the door trim 58 of the side door 60.

In the inflated and expanded state, this side airbag 20 is divided into the front side bag portion 30 and the rear side bag portion 32 that are lined-up in the vehicle longitudinal direction, and the forwardly extending portion 32B, that is provided at the upper portion of the rear side bag portion 32, extends from the side of the shoulder portion S of the seated passenger P toward the vehicle front side and is disposed above the front side bag portion 30. The dimension in the vehicle transverse direction (the inflated thickness) of this forwardly extending portion 32B is set to be smaller than that of the front side bag portion 30. Due thereto, the vehicle transverse direction inner side surface at the upper end side of the front side bag portion 30 (the upper end side of the front side main body portion 30A) becomes the upper arm portion push-up surface 62 (see FIG. 6) that curves so as to rise-up while heading toward the vehicle transverse direction outer side.

Therefore, due to the side airbag 20 and the seated passenger P approaching relatively due to the impact of a side collision, the upper arm portion push-up surface 62 and the upper arm portion A of the seated passenger P slidingly contact, and force F (see FIG. 6 and FIG. 7) that pushes the upper arm portion A upward is generated. As a result, the upper arm portion A is pushed-up toward above the front side main body portion 30A, and is restrained by the forwardly extending portion 32B that is disposed above the front side main body portion 30A. Due thereto, the upper arm portion A becoming interposed between the chest portion C of the seated passenger P and the side airbag 20 can be suppressed.

Moreover, the above-described forwardly extending portion 32B extends from the side of the shoulder portion S of the seated passenger P toward the vehicle front side and is disposed above the front side main body portion 30A (the front side bag portion 30) as described above. Therefore, for example, even in a case in which the form of the side collision is an oblique side collision and the seated passenger P inertially moves toward the obliquely front side of the vehicle, it can be made such that the shoulder portion S of the seated passenger P does not come away from the forwardly extending portion 32B. Due thereto, regardless of the form of the side collision, the shoulder portion S of the seated passenger P can be restrained well by the side airbag 20, and the restraining of the shoulder portion S can be continued up through the latter half of the collision.

Further, in the present embodiment, the abdomen portion B and the front side of the chest portion C of the seated passenger P, that have relatively low resistance, can be restrained by the front side bag portion 30 that is inflated and expanded. Further, the rear side of the chest portion C and the shoulder portion S, that have relatively high resistance, can be restrained by the rear side bag portion 32 that is inflated and expanded. Moreover, due to the upper arm portion A, that has relatively high resistance, being pushed-upward as described above, this upper arm portion A can be restrained by the forwardly extending portion 32B of the rear side bag portion 32. Namely, the body (the upper body) of the seated passenger P can be restrained appropriately by the front side bag portion 30 and the rear side bag portion 32 that are set in accordance with the high/low levels of the resistance.

Moreover, as shown in FIG. 3, the chest portion C of the seated passenger P can be restrained from the front and rear by the front side bag portion 30 and the rear side bag portion 32, and the side surface of the chest portion C can be restrained so as to be covered along the curve thereof. Due thereto, the positional relationship, in the vehicle longitudinal direction, between the chest portion C and the side airbag 20 can be stabilized.

Moreover, in the present embodiment, because the sewn portions T12, T21 are set at the boundary in the vehicle longitudinal direction between the front side bag portion 30 and the rear side bag portion 32, the concave portion 64, that is concave toward the vehicle transverse direction outer side, is formed at the vehicle transverse direction inner side surface of the side airbag 20 in a vicinity of this boundary. Accordingly, due to this concave portion 64 abutting the longitudinal direction central side (i.e., the side that projects-out most toward the vehicle transverse direction outer side) at the side surface of the chest portion C, load to the chest portion C (the ribs and the like) can be reduced.

Further, in the present embodiment, in the state in which the side airbag 20 is inflated and expanded, the internal pressure of the rear side bag portion 32, that restrains that rear side of the chest portion C, the shoulder portion S and the upper arm portion A that have relatively high resistance, is higher than the internal pressure of the front side bag portion 30 that restrains the front side of the chest portion C and the abdomen portion B that have relatively low resistance. Due thereto, the regions that have relatively high resistance can be restrained effectively while the load to the regions that have relatively low resistance at the body of the seated passenger P is reduced. As a result, the passenger restraining performance by the side airbag 20 can be improved.

Further, in the present embodiment, the dimensions in the vehicle transverse direction (the inflated thicknesses) of the side airbag 20 in the inflated and expanded state are set to the relationship "rear portion side of portion further toward lower side than forwardly extending portion 32B>front portion side of portion further toward lower side than forwardly extending portion 32B>forwardly extending portion 32B: W3>W2>W1". Due thereto, restraining in accordance with the high/low level of the load resistance at the body of the seated passenger P can be controlled not only by setting the internal pressures of the side airbag 20, but also by setting the above-described inflated thicknesses. As a result, the strength of the restraining force and the swiftness of the restraining by the side airbag 20 and the like can be controlled more appropriately. Further, it is possible to promote the behavior of pushing the upper arm portion A upward.

Moreover, in the present embodiment, the forwardly extending portion 32B of the rear side bag portion 32 is formed such that the dimension in the vertical direction in the inflated and expanded state becomes smaller while heading toward the front end side. Namely, because the vertical width of the forwardly extending portion 32B becomes narrower at the front end side, the expansion performance of the forwardly extending portion 32B into the narrow gap between the shoulder portion S of the seated passenger P and the door trim 60 of the side door 58 can be improved.

Further, in the present embodiment, in the state in which the seat back 14 is positioned at the reference setting position and the side airbag 20 is inflated and expanded, the upper end (the upper laterally extending portion T11) of the front side bag portion 30 is inclined forwardly and upwardly with respect to the vehicle longitudinal direction. Due thereto, the application point of the push-up force F, that is applied to the upper arm portion A of the seated passenger P due to the sliding contact with the vehicle transverse direction inner side surface (the upper arm portion push-up surface 62) at the upper end side of the front side main body portion 30A, can be set further toward the vehicle front side. As a result, the moment in the pushing-up direction that is applied to the upper arm portion A can be made to be large, and therefore, the upper arm portion A can be pushed-up even better.

Moreover, the forwardly extending portion 32B inflates and expands in a substantially truncated cone shape that becomes narrow toward the front end side of the side airbag 20, and the axis X (see FIG. 7) of the forwardly extending portion 32B is inclined forwardly and upwardly with respect to the vehicle longitudinal direction. Due thereto, the curved surface of the upper portion side at the vehicle transverse direction inner side surface of the forwardly extending portion 32B is inclined forwardly and upwardly along the axis X. Therefore, when the seated passenger P inertially moves obliquely toward the front of the vehicle due to the impact of an oblique side collision, due to the shoulder portion S of the seated passenger P slidingly contacting the aforementioned curved surface at the forwardly extending portion 32B, the shoulder portion S is pushed upward. Due thereto, the pushing-up of the upper arm portion A can be promoted.

Moreover, in the present embodiment, the vent holes 40, 42, that are for discharging to the exterior the gas that is supplied to the interior, are formed respectively in the front side bag portion 30 and the rear side bag portion 32. Therefore, by individually setting and changing the sizes of the vent holes 40, 42, the internal pressures of the respective bag portions 30, 32 can easily be adjusted independently.

(Supplemental Explanation of First Embodiment)

In the above-described first embodiment, there is a structure in which the communicating hole 38, that communicates the front side chamber 30 and the rear side chamber 32, is formed between the upper vertically extending portion T12 of the sewn portion T1 and the lower vertically extending portion T21 of the sewn portion T2. However, the present invention is not limited to this embodiment, and may be structured such that the communication hole 38 is omitted as in a side airbag 20' (modified example) shown in FIG. 8. In this modified example, the upper vertically extending portion T12 is extended to the lower portion side of the side airbag 20', and a lower laterally extending portion T13, that extends from the lower end of the upper vertically extending portion T12 toward the rear end side of the side airbag 20' and reaches a vicinity of the rear end edge of the side airbag 20', is provided. This lower laterally extending portion T13 is a portion of the sewn portion T1, and, in this side airbag 20', the sewn portion T2 is omitted. Due thereto, the work of sewing the side airbag 20' can be made to be easy.

Further, the above-described first embodiment is structured such that the vent holes 40, 42 are formed at the side airbag 20, but the present invention is not limited to this constitution and may be structured such that one or both of the vent holes 40, 42 is omitted.

Further, the above-described first embodiment is structured such that, in the state in which the seat back 14 is positioned at the reference setting position and the side airbag 20 is inflated and expanded, the upper end of the front side bag portion 30 (the upper laterally extending portion T11) is inclined forwardly and upwardly with respect to the vehicle longitudinal direction, but the present invention is not limited to this constitution. For example, the present invention may be a structure in which the upper end of the front side bag portion 30 runs along the vehicle longitudinal direction (extends horizontally).

Further, the above-described first embodiment is structured such that the dimension in the vertical direction in the inflated and expanded state of the forwardly extending portion 32B becomes smaller while heading toward the front end side, but the present invention is not limited to this constitution and may be structured such that the vertical direction dimension of the forwardly extending portion 32B is set to be uniform.

Moreover, the above-described first embodiment is structured such that, in the state in which the side airbag 20 is inflated and expanded, the internal pressure of the rear side bag portion 32 is higher than the internal pressure of the front side bag portion 30. However, the present invention is not limited to this constitution, and may be structured such that the internal pressures of the respective bag portions 30, 32 are equal. Further, the present invention may be structured such that the internal pressure of the front side bag portion 30 is higher than the internal pressure of the rear side bag portion 32. In this case, the effect of pushing the upper arm portion A upward by the front side bag portion 30 can be strengthened.

Further, the above-described first embodiment is structured such that, in the state in which the side airbag 20 is inflated and expanded, the boundary in the vehicle longitudinal direction of the front side bag portion 30 and the rear side bag portion 32 (the upper vertically extending portion T12, the lower vertically extending portion T21) faces the longitudinal direction central side of the chest portion C of the seated passenger P. However, the present invention is not limited to this constitution, and the position of the aforementioned boundary can be changed appropriately.

Further, although the above-described first embodiment is structured such that the front side bag portion 30 has the rearwardly extending portion 30B that extends toward below the rear side bag portion 32, the present invention is not limited to this constitution and may be structured such that the rearwardly extending portion 30B is omitted and the rear side main body portion 30A is extended downward.

The above supplementary description holds as well for the other embodiments of the present invention that are described hereinafter. Note that, in the following embodiments, structures and operations that are basically similar to those of the above-described first embodiment are denoted by this constitution reference numerals as in the above-described first embodiment, and description thereof is omitted.

Second Embodiment

Figure 9:
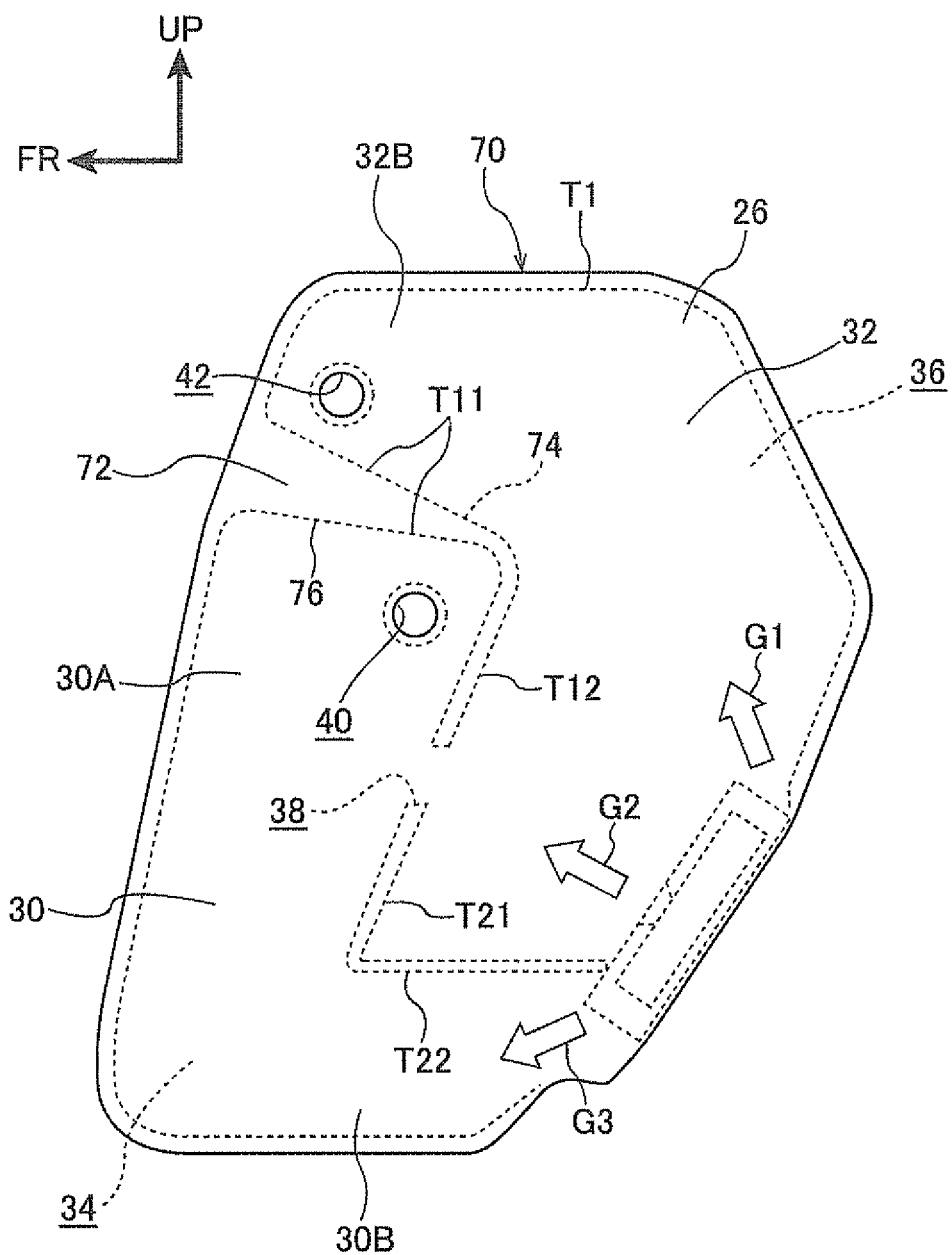
FIG. 9 is a side view showing an inflated and expanded state of a side airbag in a second embodiment of the present invention.

A state in which a side airbag 70, that is a structural member of a side airbag device for a vehicle relating to a second embodiment of the present invention, is inflated and expanded is shown in a side view in FIG. 9. This side airbag 70 differs from the side airbag 20 relating to the above-described first embodiment with regard to the point that a non-inflating portion 72 is provided between the upper end of the front side main body portion 30A and the forwardly extending portion 32B. This non-inflating portion 72 is formed by a pair of upper and lower sewn-together lines 74, 76, that structure the upper laterally extending portion T11 of the sewn portion T1, being set so as to veer apart while heading toward the front end side of the side airbag 70. Gas from the inflator 22 is not supplied to this non-inflating portion 72. Other than the above, this embodiment is structured similarly to the above-described first embodiment.

In this embodiment, by providing the non-inflating portion 72 at the side airbag 70 as described above, in the state in which the side airbag 70 is inflated and expanded, a push-up space for pushing the upper arm portion A upward is formed between the upper end of the front side main body portion 30A and the forwardly extending portion 32B. Due thereto, when the upper arm portion A of the seated passenger P is pushed-up by slidingly contacting the vehicle transverse direction inner side surface at the upper end side of the front side main body portion 30A (the upper arm portion push-up surface 62 that is not illustrated in FIG. 9), it can be made such that the forwardly extending portion 32B does not interfere with the upper arm portion A. Due thereto, the upper arm portion A can be pushed-up even better.

Third Embodiment

Figure 10:
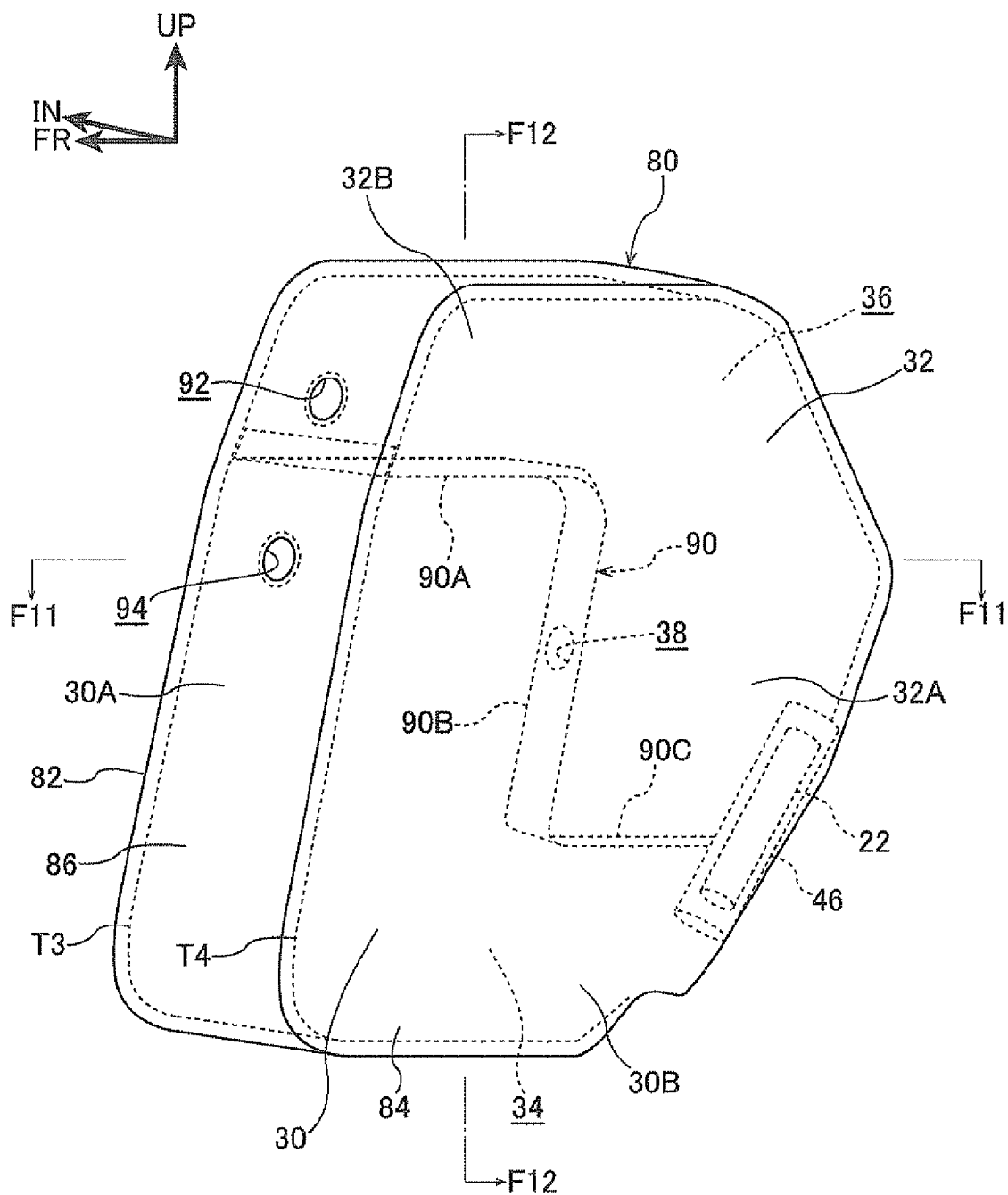
FIG. 10 is a perspective view showing a state in which a side airbag is inflated and expanded in a third embodiment of the present invention.
Figure 11:
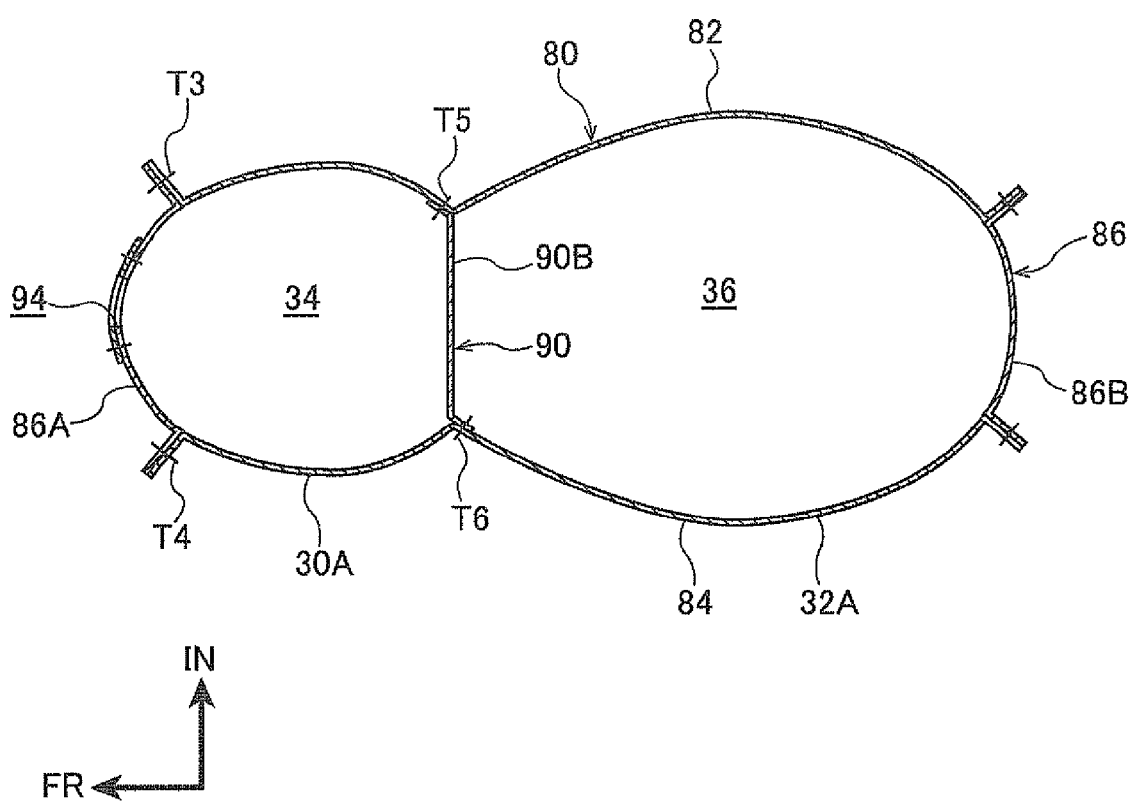
FIG. 11 is an enlarged sectional view showing the plane that is cut along line F11-F11 of FIG. 10.
Figure 12:
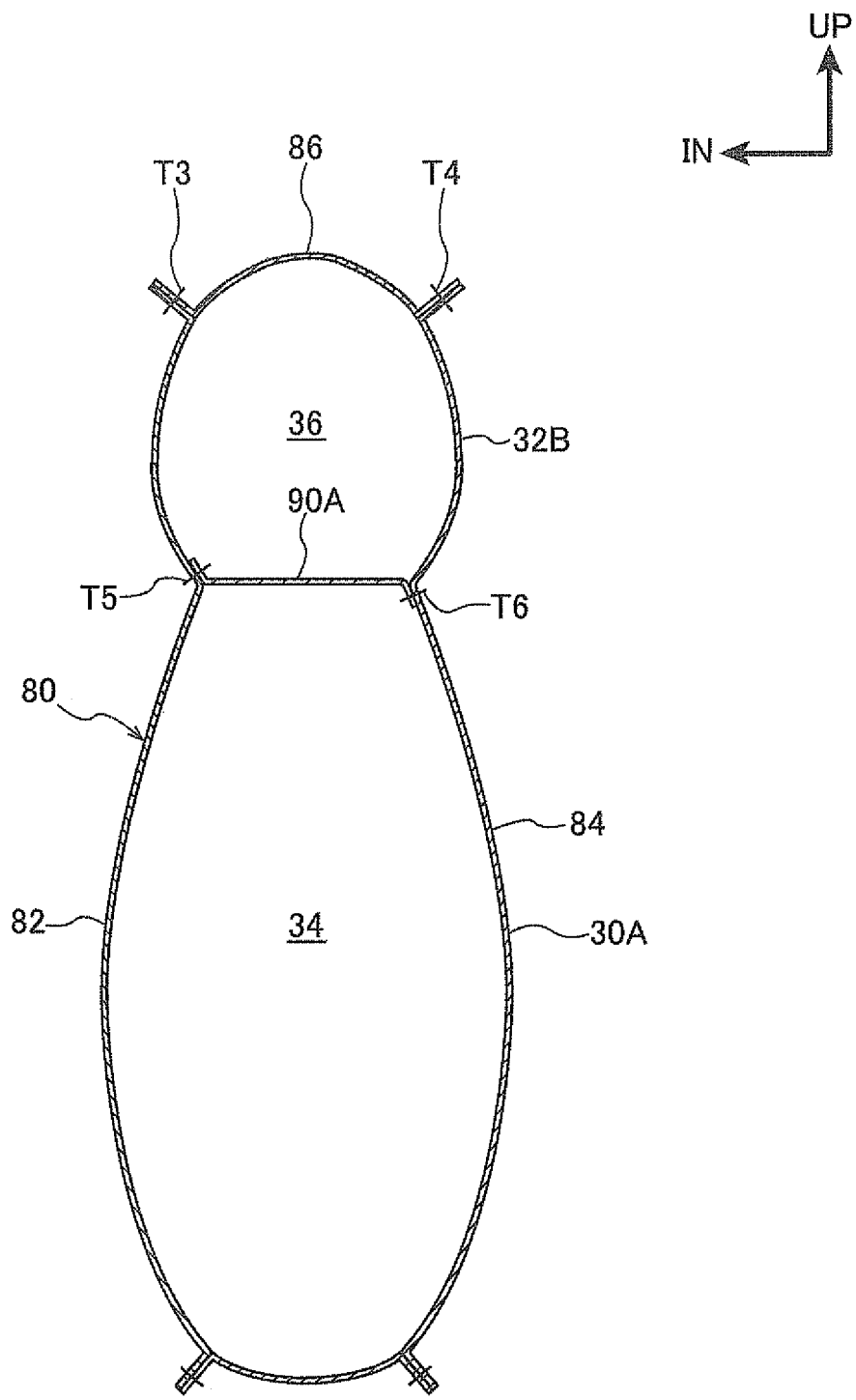
FIG. 12 is an enlarged sectional view showing the plane that is cut along line F12-F12 of FIG. 10.

A state in which a side airbag 80, that is a structural member of a side airbag device for a vehicle relating to a third embodiment of the present invention, is inflated and expanded is shown in a perspective view in FIG. 10. Further, an enlarged lateral sectional view, that shows the plane that is cut along line F11-F11 of FIG. 10, is shown in FIG. 11, and an enlarged lateral sectional view, that shows the plane that is cut along line F12-F12 of FIG. 10, is shown in FIG. 12.

The present embodiment is structured basically similarly to the above-described first embodiment, but differs from the above-described first embodiment with regard to the point that the side airbag 80 is made to be a so-called 2-chamber 3D side airbag. This side airbag 80 is formed in the shape of a bag by a pair of main base cloths (main panels) 82, 84 and a side surface base cloth (side surface panel) 86 being sewn. The pair of main base cloths 82, 84 are both formed in elongated, substantially rectangular shapes (pentagonal shapes), and are disposed in a state of facing one another. The side surface base cloth 86 is formed in the shape of a belt (a long, thin, rectangular shape), and, as shown in FIG. 11 and FIG. 12, one of the long side edge portions thereof is sewn to the peripheral edge portion of the one main base cloth 82 at a sewn portion T3, and the other long side edge portion is sewn to the peripheral edge portion of the other main base cloth 84 at a sewn portion T4. Further, the one short side edge portion and the other short side edge portion of this side surface base cloth 86 are sewn at unillustrated places. The side airbag 80, that is a flat box-shaped bag shape, is formed due thereto.

A tether 90 (partitioning wall cloth/separating wall cloth) is provided at the interior of this side airbag 80. This tether 90 is structured by a long, thin, rectangular cloth material, and, as shown in FIG. 11 and FIG. 12, one long side edge portion thereof is sewn to the one main base cloth 82 at a sewn portion T5, and the other long side edge portion is sewn to the other main base cloth 84 at a sewn portion T6.

This tether 90 is bent in a crank shape (a substantial Z-shape) as seen in side view, and is structured by an upper laterally extending portion 90A that extends from the upper portion side of the front edge portion of the side airbag 80 toward the rear end side of the side airbag 80 and reaches a vicinity of the longitudinal direction intermediate portion of the side airbag 80, a vertically extending portion 90B that extends from the rear end of the upper laterally extending portion 90A toward the lower end side of the side airbag 80 and reaches the lower portion side of the side airbag 80, and a lower laterally extending portion 90C that extends from the lower end of the vertically extending portion 90B toward the rear end side of the side airbag 80 and reaches a vicinity of the rear end edge of the side airbag 80. The front end portion of the upper laterally extending portion 90A is sewn to a front surface portion 86A of the side surface base cloth 86. Further, a placement space for the inflator 22 and the diffuser 46 is set between the rear end portion of the lower laterally extending portion 90C and a rear surface portion 86B (see FIG. 11) of the side surface base cloth 86. The side airbag 80 is divided (sectioned) into the front side bag portion 30, that is L-shaped in side view, and the rear side bag portion 32, that is inverted L-shaped in side view, by this tether 90.

A pair of upper and lower vent holes 92, 94 are formed in the upper portion side of the front surface portion 86A of the side surface base cloth 86. The vent hole 94 at the lower side communicates the interior of the front side bag portion 30 (the front side chamber 34) and the exterior of the side airbag 80. The vent hole 92 at the lower side communicates the interior of the rear side bag portion 32 (the rear side chamber 36) and the exterior of the side airbag 80. Further, the communication hole 38, that communicates the front side chamber 34 and the rear side chamber 36, is formed at the vertical direction intermediate portion of the vertically extending portion 90B of the tether 90.

Other than the above-described points, this side airbag 80 is structured similarly to the side airbag 20 relating to the above-described first embodiment. Accordingly, this embodiment as well achieves basically similar operation and effects as the above-described first embodiment. Moreover, at this side airbag 80, the vent holes 92, 94 are formed in the front surface portion 86A (the surface that faces toward the vehicle front side in the inflated and expanded state) of the side surface base cloth 86. Accordingly, the vent holes 92, 94 becoming blocked by the seated passenger P or the door trim 60 can be prevented or effectively suppressed, and a stable gas escaping effect can be obtained. Moreover, at this side airbag 80, the inflated thickness in the vehicle transverse direction can be set to be larger than that of the side airbag 20, and therefore, the passenger protecting performance can be improved.

Fourth Embodiment

Figure 13:
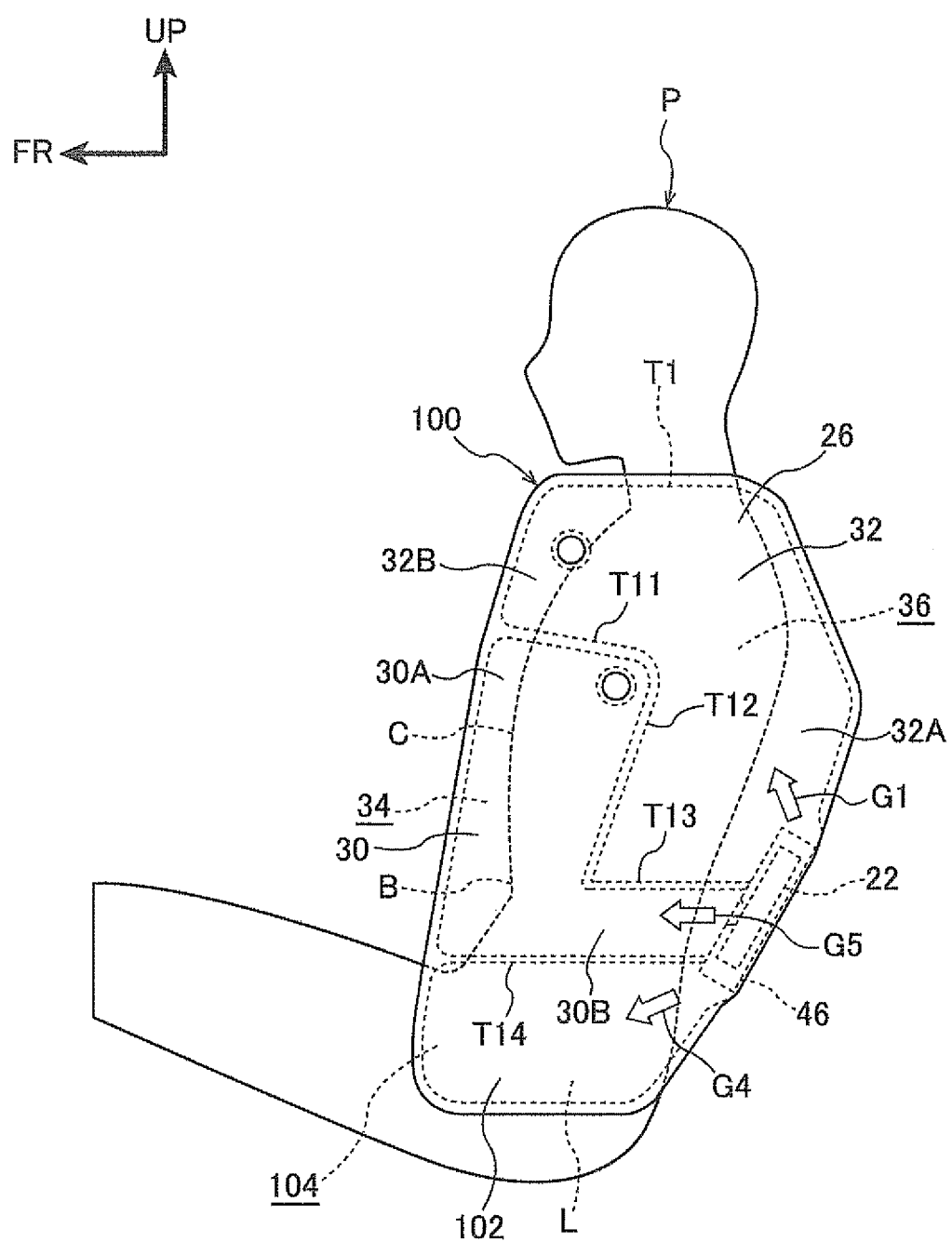
FIG. 13 is a side view showing an inflated and expanded state of a side airbag in a fourth embodiment of the present invention.

A state in which a side airbag 100, that is a structural member of a side airbag device for a vehicle relating to a fourth embodiment of the present invention, is inflated and expanded is shown in a side view in FIG. 13. Note that illustration of the shoulder portion S and the upper arm portion A of the seated passenger P is omitted from FIG. 13 in order to make the figure easy to view. This side airbag 100 differs from the side airbag 20 relating to the above-described first embodiment with regard to the point of having a lower side bag portion 102. Namely, in this side airbag 100, the base cloth 26 is extended downward, and this extended portion is divided vertically by a lower partitioning portion T14 that is provided T1. Due thereto, the lower side bag portion 102 is formed beneath the front side bag portion 30. The interior of this lower side bag portion 102 is made to be a waist portion chamber 104 that restrains a waist portion L of the seated passenger P. This is a structure in which gas that is jetted-out from the inflator 22 is supplied to this waist portion chamber 104 via the lower end opening portion of the diffuser 46 (see arrow G4 of FIG. 13).

Note that this embodiment is structured such that, in the same way as the modified example (see FIG. 8) of the above-described first embodiment, the communication hole 38 is omitted, and gas of the inflator 22 is supplied to the front side chamber 30 via an unillustrated opening portion that is formed in the vertical direction intermediate portion of the diffuser 46 (see arrow G5 of FIG. 13).

Other than the above, this embodiment is structured similarly to the above-described first embodiment. Accordingly, this embodiment as well achieves basically similar operation and effects as the above-described first embodiment. Moreover, the waist portion L of the seated passenger P, that has relatively high resistance, can be restrained by the lower side bag portion 102 of the side airbag 100, and therefore, the passenger restraining performance by the side airbag 100 can be improved even more. Further, because the lower side bag portion 102 and the front side bag portion 30 are divided by the lower partitioning portion T14, the dimension (inflated thickness) in the vehicle transverse direction of the lower side bag portion 102 in the inflated and expanded state can be set in accordance with the narrow gap between the waist portion L of the seated passenger P and the door trim 60.

Fifth Embodiment

Figure 14:
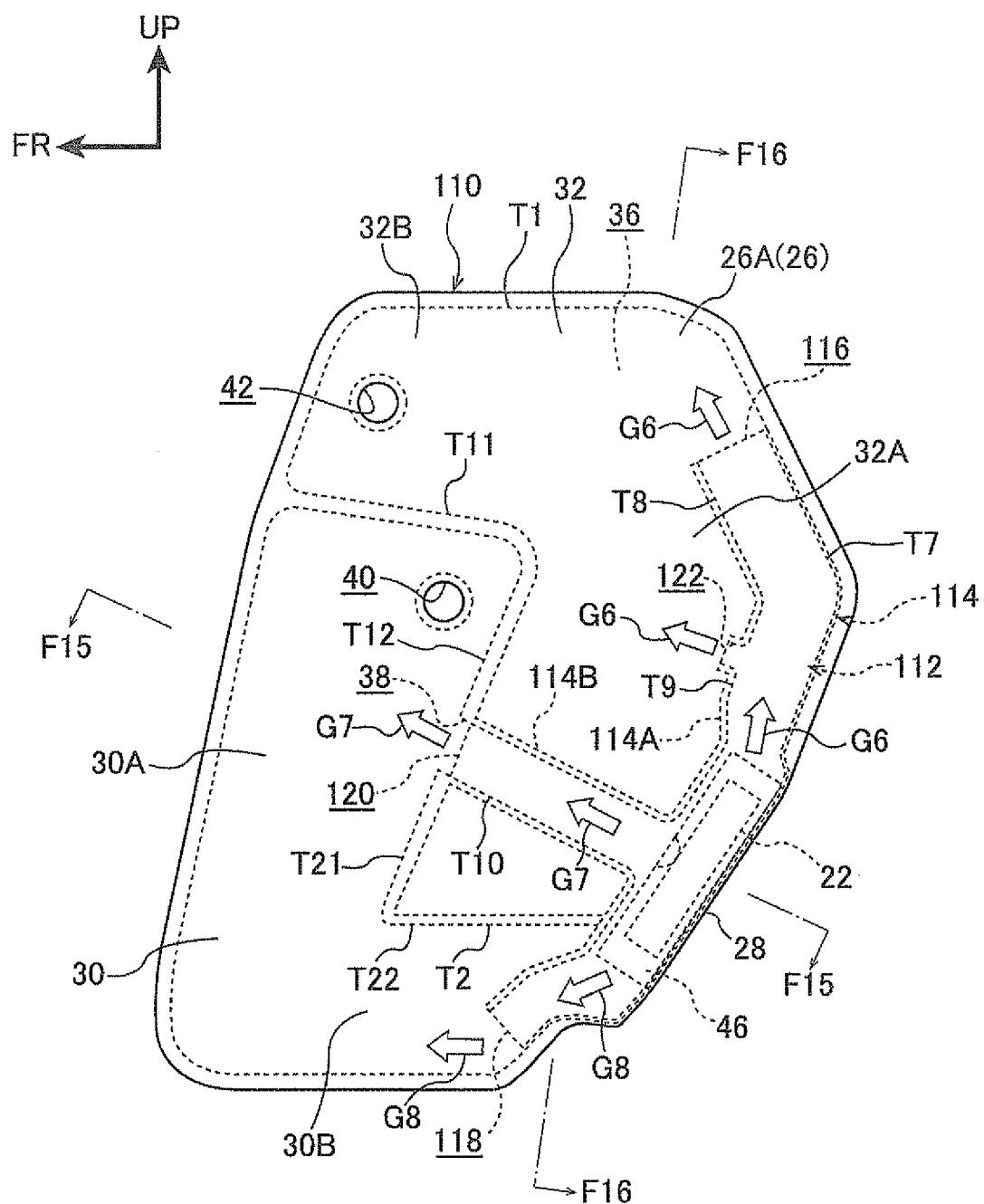
FIG. 14 is a side view showing an inflated and expanded state of a side airbag in a fifth embodiment of the present invention.
Figure 16:
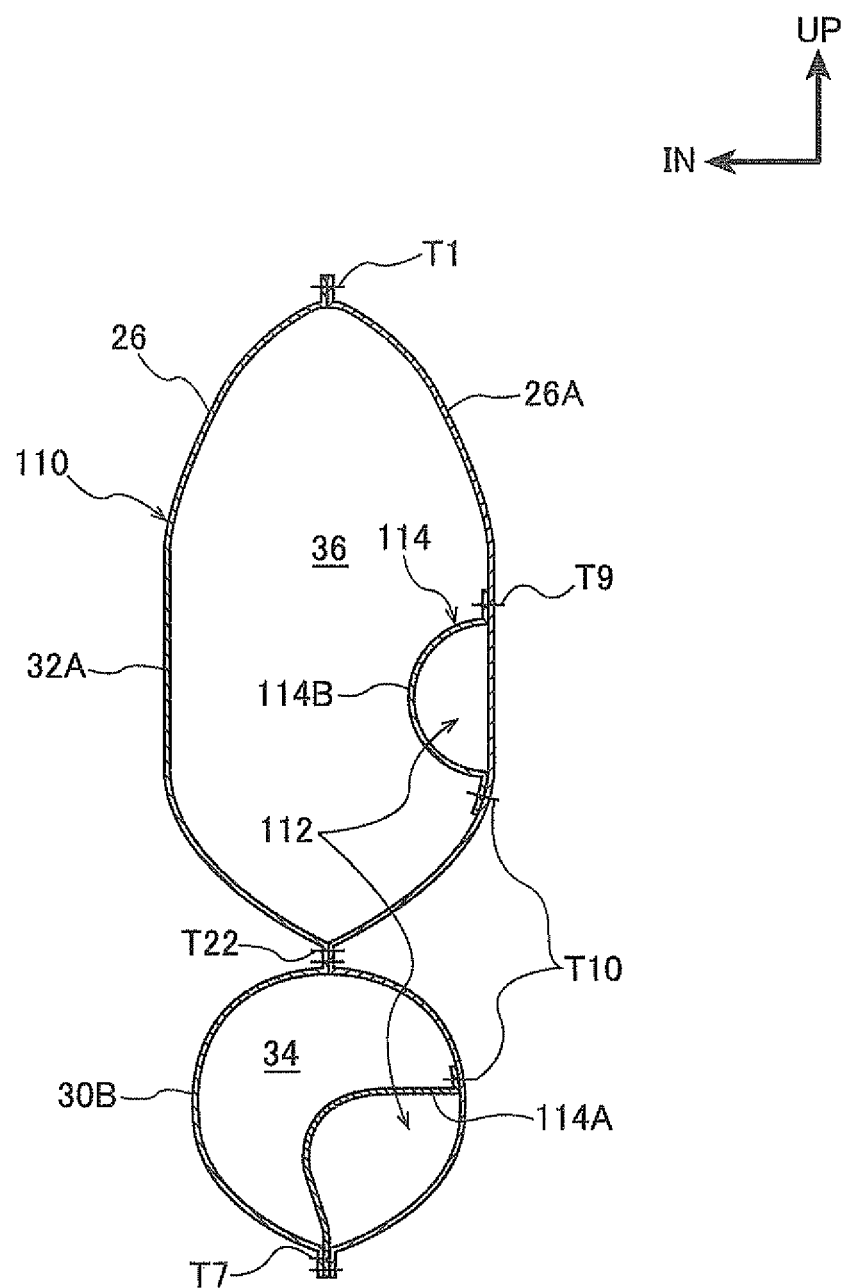
FIG. 16 is an enlarged sectional view showing the plane that is cut along line F16-F16 of FIG. 14.

A state in which a side airbag 110, that is a structural member of a side airbag device for a vehicle relating to a fifth embodiment of the present invention, is inflated and expanded is shown in a side view in FIG. 14. Further, an enlarged lateral sectional view, that shows the plane that is cut along line F15-F15 of FIG. 14, is shown in FIG. 15, and an enlarged vertical sectional view, that shows the plane that is cut along line F16-F16 of FIG. 14, is shown in FIG. 16.

This side airbag 110 differs from the side airbag 20 relating to the above-described first embodiment with regard to the point of having a gas flow path 112 for supplying the gas jetted-out from the inflator 22 independently to the front side bag portion 30 interior (the front side chamber 34) and the rear side bag portion 32 interior (the rear side chamber 36) respectively. Namely, a tube cloth 114 for promoting expansion, that is for forming the gas flow path 112, is provided at the interior of this side airbag 110. This tube cloth 114 for promoting expansion has a vertically extending portion 114A that extends vertically along the rear end edge of the side airbag 110, and a front side extending portion 114E that extends from the vertical direction intermediate portion of the vertically extending portion 114A toward the front end side of the side airbag 110. One long side edge portion of the vertically extending portion 114A is sewn to the base cloth 26 at a sewn portion T7 that runs along the rear end edge of the side airbag 110, and is sewn to an outer side portion 26A of the base cloth 26 (i.e., a region of the side airbag 110 that is disposed at the vehicle transverse direction outer side in the inflated and expanded state) at at sewn portions T8, T9, T10. Further, the front side extending portion 114B is sewn to the outer side portion 26A of the base cloth 26 at sewn portions T9, T10. Due thereto, the gas flow path 112 that is trifurcated is formed.

An upper end opening portion 116 of this gas flow path 112 (the upper end portion of the vertically extending portion 114A) is positioned at the upper portion of the rear side chamber 36, and a lower end opening portion 118 of the gas flow path 112 (the lower end portion of the vertically extending portion 114A) is positioned at the lower end portion of the front side chamber 34. Further, a front end opening portion 120 of the gas flow path 112 (the front end portion of the front side extending portion 114B) is connected to the communication hole 38. Moreover, an intermediate opening portion 122, that communicates the gas flow path 112 with the rear side chamber 36, is formed in the vertically extending portion 114A at the intermediate portion between the upper end portion of the vertically extending portion 114A and the front side extending portion 114B.

Further, the inflator 22 and the diffuser 46 are accommodated in a vicinity of the connected portion of the front side extending portion 114B and the vertically extending portion 114A at the gas flow path 112 interior. Further, the gas, that is jetted-out from the upper end opening portion of the diffuser 46 at the time of operation of the inflator 22, is jetted-out from the upper end opening portion 116 and the intermediate opening portion 122 of the gas flow path 112 toward the rear side chamber 36 (see arrows G6 of FIG. 14). Due thereto, the rear side chamber 36 inflates and expands.

Further, the gas, that is jetted-out from unillustrated opening portions that are formed in the vertical direction intermediate portion of the diffuser 46 at the time of operation of the inflator 22, is jetted-out from the front end opening portion 120 of the gas flow path 112 (the communication hole 38) toward the front side chamber 34 (see arrow G7 of FIG. 14 and FIG. 15). Moreover, the gas, that is jetted-out from the lower end opening portion of the diffuser 46, is jetted-out from the lower end opening portion 118 of the gas flow path 112 toward the front side chamber 34 (see arrow G8 of FIG. 14). Due thereto, the front side chamber 34 inflates and expands.

In this way, in this embodiment, the gas that the inflator 22 generates is supplied by the gas flow path 112 independently to the front side chamber 34 and the rear side chamber 36, respectively. Due thereto, gas staying within the respective chambers 34, 36 can be suppressed, and the inflation and expansion of the front side bag portion 30 and the rear side bag portion 32 can be promoted individually. Therefore, as a result, the early-stage expansion performance of the side airbag 110, i.e., the initial restraining performance of the seated passenger P, can be improved. Further, because the tube cloth 114 for expansion promotion, that structures the gas flow path 112, is sewn to the outer side portion 26A of the base cloth 26 (the side opposite the seated passenger P in the inflated and expanded state), the seated passenger P is not affected by the high-temperature gas that is jetted-out from the inflator 22, which is suitable.

Although the present invention has been described above by illustrating several embodiments, the present invention is not limited to these embodiments, and can be embodied by being changed in various ways within a scope that does not deviate from the gist thereof. Further, the claims are, of course, not limited to the above-described respective embodiments.

The invention claimed is:

1. A side airbag device for a vehicle, comprising:
   an inflator that is provided at a vehicle seat and that, when a side collision of a vehicle is sensed or predicted, is operated and generates gas; and
   a side airbag that is provided at a side portion of a seat back of the vehicle seat, and that inflates and expands between a seated passenger and a vehicle body side portion due to gas that the inflator generates being supplied to an interior of the side airbag, and that, in an inflated and expanded state, is divided into a front side bag portion and a rear side bag portion that are lined-up in a vehicle longitudinal direction, and at which a forwardly extending portion, that is provided at an upper portion of the rear side bag portion, extends from a side of a shoulder portion of the seated passenger toward a vehicle front side and is disposed above the front side bag portion, and, due to a dimension in a vehicle transverse direction of the forwardly extending portion being set to be smaller than that of the front side bag portion, a vehicle transverse direction inner side surface at an upper end side of the front side bag portion is inclined or curved so as to rise up while heading toward a vehicle transverse direction outer side.

2. The side airbag device for a vehicle of claim 1, wherein the front side chamber has a rearwardly extending portion that extends toward below the rear side chamber, and inflates and expands at a side of an abdomen portion and a chest portion front side of the seated passenger, and the rear side chamber inflates and expands at a side of a chest portion rear side and the shoulder portion of the seated passenger.

3. The side airbag device for a vehicle of claim 2, wherein the side airbag is formed such that a boundary, in the vehicle longitudinal direction, of the front side bag portion and the rear side bag portion in an inflated and expanded state faces a longitudinal direction central side of a chest portion of the seated passenger.

4. The side airbag device for a vehicle of claim 2, wherein the side airbag is structured such that, in an inflated and expanded state, an internal pressure of the rear side bag portion is higher than an internal pressure of the front side bag portion.

5. The side airbag device for a vehicle of claim 1, wherein a non-inflating portion is provided at the side airbag between an upper end of the front side bag portion and the forwardly extending portion.

6. The side airbag device for a vehicle of claim 1, wherein the forwardly extending portion is formed such that a dimension, in a vertical direction in an inflated and expanded state, becomes smaller while heading toward a front end side.

7. The side airbag device for a vehicle of claim 6, wherein the side airbag is formed such that, in a state in which the seat back is positioned at a reference setting position and the side airbag is inflated and expanded, an upper end of the front side bag portion is inclined forwardly and upwardly with respect to the vehicle longitudinal direction.

8. The side airbag device for a vehicle of claim 1, wherein a vent hole for discharging, to an exterior, gas that has been supplied to an interior, is formed in each of the front side bag portion and the rear side bag portion.

9. The side airbag device for a vehicle of claim 1, wherein a gas flow path for supplying gas, that the inflator generates, independently to the front side bag portion interior and the rear side bag portion interior respectively, is provided at the side airbag.

10. The side airbag device for a vehicle of claim 1, wherein the side airbag has a lower side bag portion that inflates and expands below the front side bag portion and at a side of a waist portion of the seated passenger.

11. The side airbag device for a vehicle of claim 10, wherein a gas flow path for supplying gas, that the inflator generates, independently to the front side bag portion interior, the rear side bag portion interior, and the lower side bag portion interior respectively, is provided at the side airbag.

12. The side airbag device for a vehicle of claim 1, wherein the side airbag is formed such that, in an inflated and expanded state, a dimension in the vehicle transverse direction of a front portion side of a portion, that is further toward a lower side than the forwardly extending portion, is smaller than that of a rear portion side.

* * * * *